United States Patent
Wakita et al.

(10) Patent No.: US 9,824,447 B2
(45) Date of Patent: Nov. 21, 2017

(54) INFORMATION PROCESSING APPARATUS, INFORMATION PROCESSING SYSTEM, AND INFORMATION PROCESSING METHOD

(71) Applicants: Yuki Wakita, Tokyo (JP); Junko Nakano, Tokyo (JP)

(72) Inventors: Yuki Wakita, Tokyo (JP); Junko Nakano, Tokyo (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 14/936,039

(22) Filed: Nov. 9, 2015

(65) Prior Publication Data

US 2016/0140715 A1    May 19, 2016

(30) Foreign Application Priority Data

Nov. 17, 2014    (JP) .................................. 2014-232879

(51) Int. Cl.
*G06K 9/46* (2006.01)
*G06K 9/66* (2006.01)
(Continued)

(52) U.S. Cl.
CPC ...... *G06T 7/0024* (2013.01); *G06F 17/30247* (2013.01); *G06F 17/30259* (2013.01);
(Continued)

(58) Field of Classification Search
CPC ........ G06F 17/30247; G06F 17/30259; G06K 2009/4666; G06K 9/46; G06K 9/6215;
(Continued)

(56) References Cited

U.S. PATENT DOCUMENTS

| 7,043,474 B2 * | 5/2006 | Mojsilovic ........ G06F 17/30256 |
| 7,756,309 B2 * | 7/2010 | Gholap ............. G06F 17/30247 382/128 |

(Continued)

FOREIGN PATENT DOCUMENTS

| JP | 2014-010722 | 1/2014 |
| JP | 2014-010723 | 1/2014 |

(Continued)

OTHER PUBLICATIONS

Extended European Search Report dated Apr. 7, 2016 in Patent Application No. 15194341.2.

*Primary Examiner* — Kanjibhai Patel
(74) *Attorney, Agent, or Firm* — Oblon, McClelland, Maier & Neustadt, L.L.P.

(57) ABSTRACT

An image search device includes: a search unit that retrieves an image similar to a search target image from a registration unit where an image and link information are registered in an associated manner; and a transmission unit that transmits, to a terminal device, the link information associated with the retrieved image. An information processing apparatus controls registration of an image and link information in the registration unit. The information processing apparatus extracts a predetermined area from a registration target image to be registered in the registration unit, transmits an image of the predetermined area to the search unit, and determines whether a similar image including an image similar to the predetermined area is registered in the registration unit based on a search result of the search unit. In the case where determination is made that a similar image is registered in the registration unit, such a fact is notified.

16 Claims, 19 Drawing Sheets

(51) Int. Cl.
  *G06T 7/00* (2017.01)
  *G06F 17/30* (2006.01)
  *G06K 9/62* (2006.01)
  *G06T 7/30* (2017.01)
(52) U.S. Cl.
  CPC ............. *G06K 9/46* (2013.01); *G06K 9/6215* (2013.01); *G06T 7/30* (2017.01); *G06K 2009/4666* (2013.01); *G06T 2207/20021* (2013.01)
(58) Field of Classification Search
  CPC  G06T 2207/20021; G06T 7/0024; G06T 7/30
  USPC .................................................. 382/190, 195
  See application file for complete search history.

(56) References Cited

U.S. PATENT DOCUMENTS

| | | | |
|---|---|---|---|
| 8,200,010 B1 | 6/2012 | Jing et al. | |
| 8,805,079 B2 * | 8/2014 | Petrou | G06F 17/30253 |
| | | | 382/187 |
| 9,442,553 B2 * | 9/2016 | Enohara | H05B 37/029 |
| 2007/0143272 A1 * | 6/2007 | Kobayashi | G06F 17/30247 |
| 2008/0030792 A1 * | 2/2008 | Shiiyama | G06F 17/30265 |
| | | | 358/402 |
| 2008/0212899 A1 | 9/2008 | Gokturk et al. | |
| 2009/0285444 A1 | 11/2009 | Erol et al. | |
| 2010/0135582 A1 | 6/2010 | Gokturk et al. | |
| 2013/0121571 A1 | 5/2013 | Gokturk et al. | |
| 2014/0006387 A1 | 1/2014 | Kishi et al. | |
| 2014/0006435 A1 | 1/2014 | Kishi et al. | |
| 2014/0016822 A1 | 1/2014 | Sakamoto | |
| 2014/0362235 A1 | 12/2014 | Kishi et al. | |
| 2015/0016675 A1 | 1/2015 | Kishi | |
| 2015/0381630 A1 | 12/2015 | Kishi et al. | |

FOREIGN PATENT DOCUMENTS

| | | |
|---|---|---|
| JP | 2014-238742 | 12/2014 |
| JP | 2015-018405 | 1/2015 |
| JP | 2016-12207 A | 1/2016 |

* cited by examiner

FIG.10

| CLIENT NAME | USER ID | HOST DOMAIN | SALES COMPANY ADMINISTRATOR NAME | LATEST UPDATE DATE | PAGES OPEN TO PUBLIC | NUMBER OF USED PAGES | NUMBER OF PAGES UNDER CONTRACT |
|---|---|---|---|---|---|---|---|
| AAA | 111 | Japan | SALES COMPANY ADMINISTRATOR A | 2014/04/22 | 10 | 20 | 25 |
| BBB | 222 | Japan | SALES COMPANY ADMINISTRATOR A | 2014/04/22 | 5 | 10 | 25 |
| CCC | 333 | Japan | SALES COMPANY ADMINISTRATOR B | 2014/04/22 | 0 | 5 | 50 |
| DDD | 444 | Europe | SALES COMPANY ADMINISTRATOR C | 2014/04/22 | 15 | 22 | 100 |
| EEE | 555 | America | SALES COMPANY ADMINISTRATOR D | 2014/04/22 | 20 | 35 | 25 |
| FFF | 666 | Asia | SALES COMPANY ADMINISTRATOR E | 2014/04/22 | 10 | 10 | 25 |

LOGIN USER: user_2222

411a ADMINISTRATOR LIST
411b CLIENT LIST
411c CAMPAIGN LIST

412 NEW REGISTRATION / EDIT / DELETE / CSV OUTPUT
413 SEARCH KEY / INPUT SEARCH KEYWORD / SEARCH / CLEAR
415 FINISH

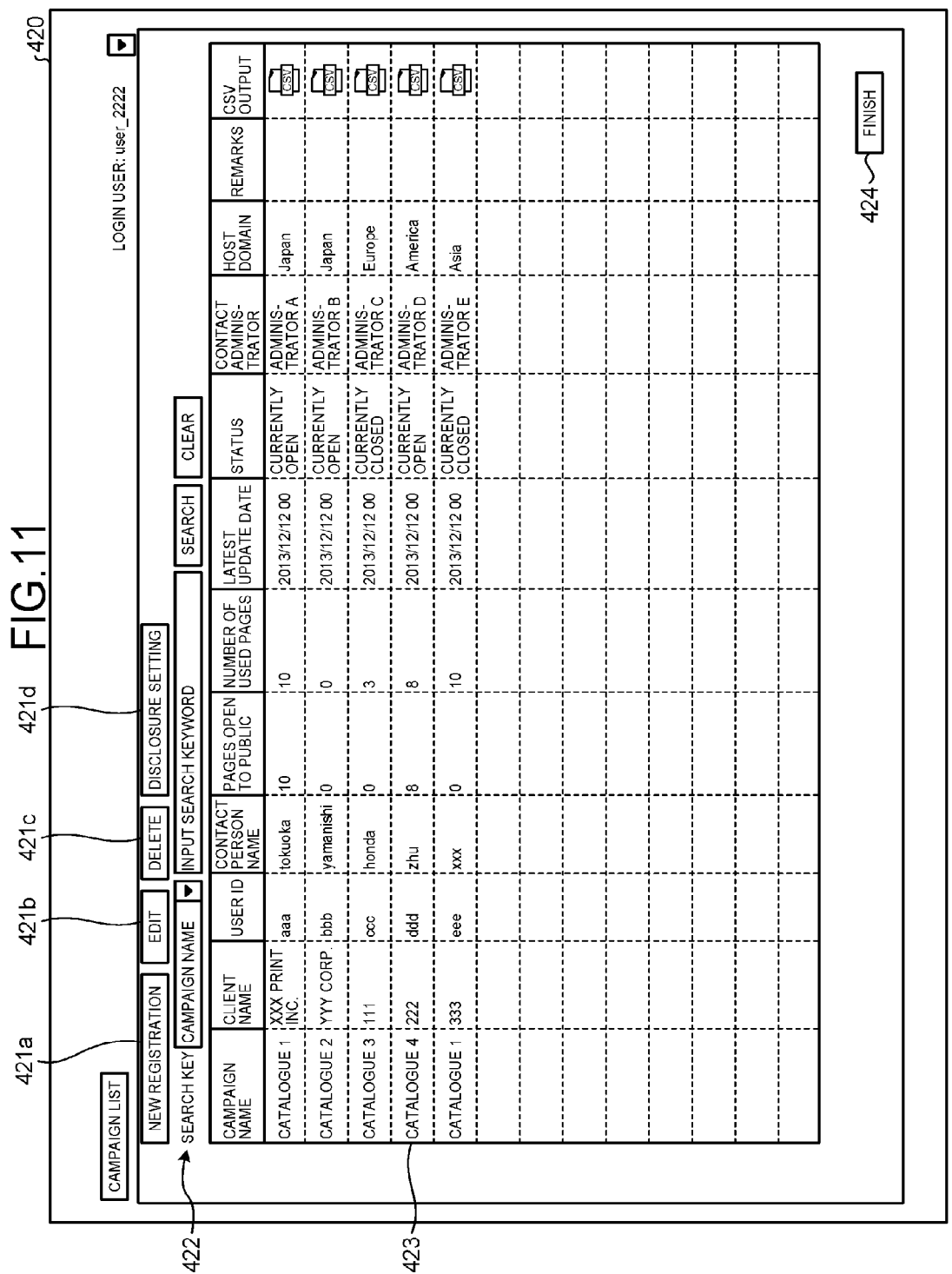

INFORMATION PROCESSING APPARATUS, INFORMATION PROCESSING SYSTEM, AND INFORMATION PROCESSING METHOD

CROSS-REFERENCE TO RELATED APPLICATIONS

The present application claims priority to and incorporates by reference the entire contents of Japanese Patent Application No. 2014-232879 filed in Japan on Nov. 17, 2014.

BACKGROUND OF THE INVENTION

1. Field of the Invention

The present invention relates to an information processing apparatus, an information processing system, and an information processing method.

2. Description of the Related Art

There is a known image searching technology in which feature points are extracted from a captured image captured by, for example, a camera and an image that has a large number of similar feature points is retrieved from among a group of images preliminarily registered. There is a known technology utilizing such an image searching technology in which images of a specific photograph and a printed material are registered in a database in a manner associated with various electronic data, and a similar image is retrieved from the database by using captured images obtained by capturing the photograph and printed material, and electronic data associated with the similar image is presented (JP 2014-010723 A, for example).

Here, in the case of newly registering an image (provided as an image A) in a database in image search service using an image searching technology as described above, there may be a case where an image similar to the image to be newly registered (provided as an image B) is already registered. In this case, the image B similar to the image A may be retrieved although a user searches the database of the image search service based on a captured image corresponding to the image A, and there is a problem in which a user cannot obtain an intended search result.

In view of such a situation, there is a need to achieving to retrieve a similar image with higher accuracy.

SUMMARY OF THE INVENTION

It is an object of the present invention to at least partially solve the problems in the conventional technology.

According to example embodiments of the present invention, there is provided an information processing apparatus comprising: a communication unit that connects to an image search device via a network to communicate with the image search device, the image search device including the registration unit that registers the image and link information in an associated manner, a search unit that retrieves an image similar to a search target image from the registration unit, and a transmission unit that transmits, to a terminal device, the link information associated with the retrieved image; an extraction unit that extracts an image of a predetermined area from a registration target image specified as a target to be registered in the registration unit; a determining unit that transmits the image of the predetermined area to the search unit, and determines whether a similar image that includes an image similar to the image of the predetermined area is registered in images registered in the registration unit based on a search result of the search unit; and a notification unit that notifies the predetermined area in the case where determination is made that the similar image is registered in the images registered in the registration unit.

Example embodiments of the present invention also provide an information processing system comprising an image search device and an information processing apparatus; the image search device including a registration unit that registers an image and link information in an associated manner, a search unit that retrieves an image similar to a search target image from the registration unit, and a transmission unit that transmits, to a terminal device, the link information associated with the retrieved image, and the information processing apparatus including an acquisition unit that acquires a registration target image to be registered in the registration unit; an extraction unit that extracts an image of a predetermined area from a registration target image specified as a target to be registered in the registration unit; a determining unit that transmits the image of the predetermined area to the search unit, and determines whether a similar image that includes an image similar to the image of the predetermined area is registered in images registered in the registration unit based on a search result of the search unit; and a notification unit that notifies the predetermined area in the case where determination is made that the similar image is registered in the images registered in the registration unit.

Example embodiments of the present invention also provide an information processing method implemented in an information processing apparatus that is connected to an image search system via a network, the information processing method comprising: acquiring a registration target image to be registered in a registration unit of the image search system, the registration unit registering an image and link information in an associated manner; extracting a predetermined area from the registration target image; transmitting an image of the predetermined area to the search unit of the image search system, and determining whether a similar image including an image similar to the predetermined area is registered in the registration unit based on a search result of the search unit, the search unit retrieving an image similar to a search target image from the registration unit; and notifying that the similar image is registered in the registration unit in the case where determination is made that the similar image is registered, wherein the image search system including a transmission unit that transmits, to a terminal device, the link information associated with the retrieved image retrieved by the search unit based on a captured image received from the terminal device.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 10 is a diagram illustrating an exemplary menu screen according to the respective embodiments;

FIG. 11 is a diagram illustrating an exemplary registered information list screen according to the respective embodiments;

DETAILED DESCRIPTION OF THE PREFERRED EMBODIMENTS

Embodiments of an information processing apparatus, an information processing system, and an information processing method will be described below in detail with reference to the attached drawings.
(System Applicable to Respective Embodiments)

Figure 1:
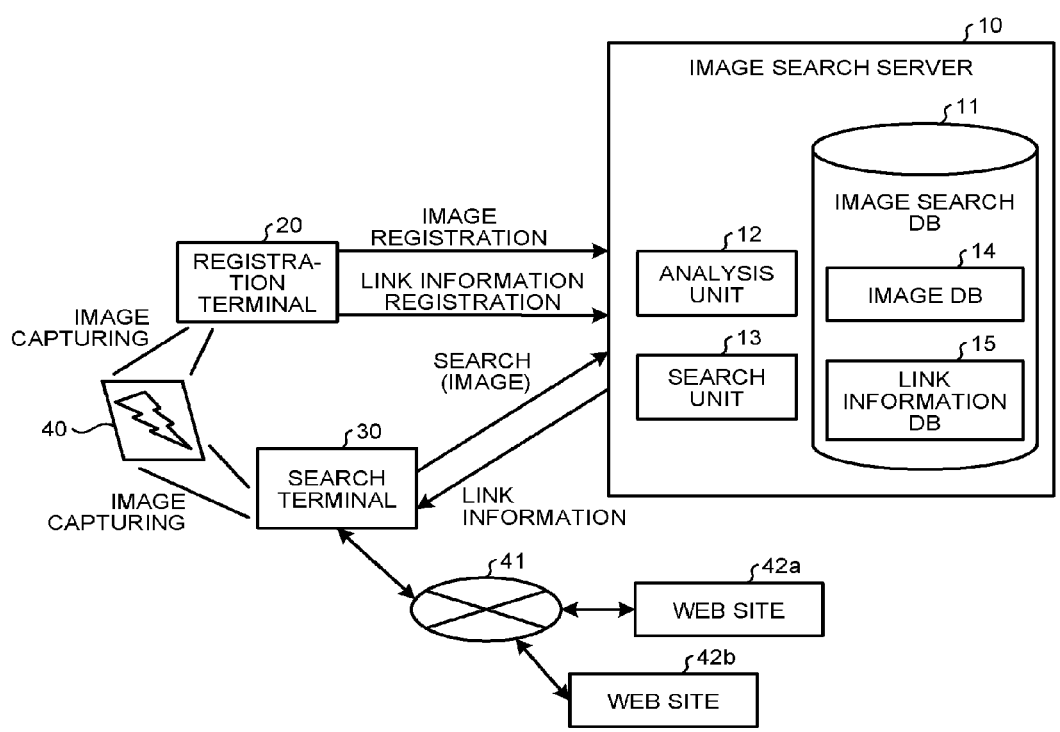
FIG. 1 is a diagram schematically illustrating an exemplary image search system applicable to respective embodiments of the present invention.

FIG. 1 is a diagram schematically illustrating an exemplary image search system applicable to respective embodiments. In FIG. 1, the image search system includes an image search server 10, and can communicate with a registration terminal 20 and a search terminal 30 via a network. The image search server 10 may be formed of one information processing apparatus, and may also be formed of a plurality of information processing apparatuses connected one another in a manner decentralizing functions.

The image search server 10 registers, in a database, an image and link information transmitted from the registration terminal 20 in an associated manner. The image search server 10 makes a search for an image registered in the database based on a captured image transmitted from the search terminal 30 and obtained by capturing the subject 40, and transmits the link information associated with an image retrieved by search to the search terminal 30.

The image search server 10 includes an analysis unit 12, a search unit 13, and an image search database (DB) 11. The image search DB 11 includes an image database (DB) 14 and a link information database (DB) 15. The image DB 14 registers images in a retrievable manner. In the link information DB 15, the link information to be linked with an image registered in the image DB 14 is registered in a manner associated with the image.

More specifically, the image search server 10 analyzes an image to be registered by the analysis unit 12, and extracts feature information representing a feature of the image. The image search server 10 stores the extracted feature information in the image DB 14 in a manner associated with image identifying information to identify the image. The image search server 10 also stores, in the link information DB 15, link information to be provided to a user in a manner associated with the image identifying information. The image (feature information) and the link information are respectively associated with the image identifying information and stored in the image DB 14 and the link information DB 15, thereby registering the image in the image search DB 11.

The registration terminal 20 acquires the image and the link information to be associated with the image, and transmits the image and the link information to the image search server 10. The image search server 10 stores the image and the link information transmitted from the registration terminal 20 in the image DB 14 and the link information DB 15 as described above, thereby registering the image in the image search DB 11.

Note that the registration terminal 20 uses a captured image obtained by capturing the subject 40 as an image to be registered in the image search DB 11 in the example of FIG. 1. Not limited to this example, the registration terminal 20 may use an image supplied from outside or an image created inside the registration terminal 20 as the image to be registered in the image search DB 11.

The search terminal 30 has an image capturing function, and can transmit the image obtained by capturing the subject 40 to the image search server 10 via the network. The search terminal 30 starts the imaging function in accordance with, for example, user's operation and captures the image of the subject 40 and transmits, to the image search server 10, the image obtained from image capturing and a search request to request search for an image similar to this image. The image search server 10 searches the image DB 14 for an image similar to the image in accordance with the image and the search request transmitted from the search terminal 30, and outputs identifying information of a retrieved image as a search result.

For example, the image transmitted from the search terminal 30 is received in the search unit 13 of the image search server 10. The search unit 13 passes the received image to the analysis unit 12. The analysis unit 12 analyzes the image passed from the search unit 13, and extracts feature information from the image, and then passes the extracted feature information to the search unit 13. Based on the feature information passed from the analysis unit 12, the search unit 13 retrieves feature information having high similarity to the feature information from the image DB 14. The search unit 13 acquires, from the link information DB 15, link information associated with the image identifying information corresponding to the retrieved feature information, and transmits the link information to the search terminal 30.

The link information can include a uniform resource locator (URL) of a Web site 42a and a Web site 42b on Internet 41, for example. In this case, the search terminal 30 can access the Web site 42a and the Web site 42b via the Internet 41 in accordance with the link information retrieved at the image search server 10 and transmitted based on the captured image obtained by capturing the subject 40.

Figure 2:
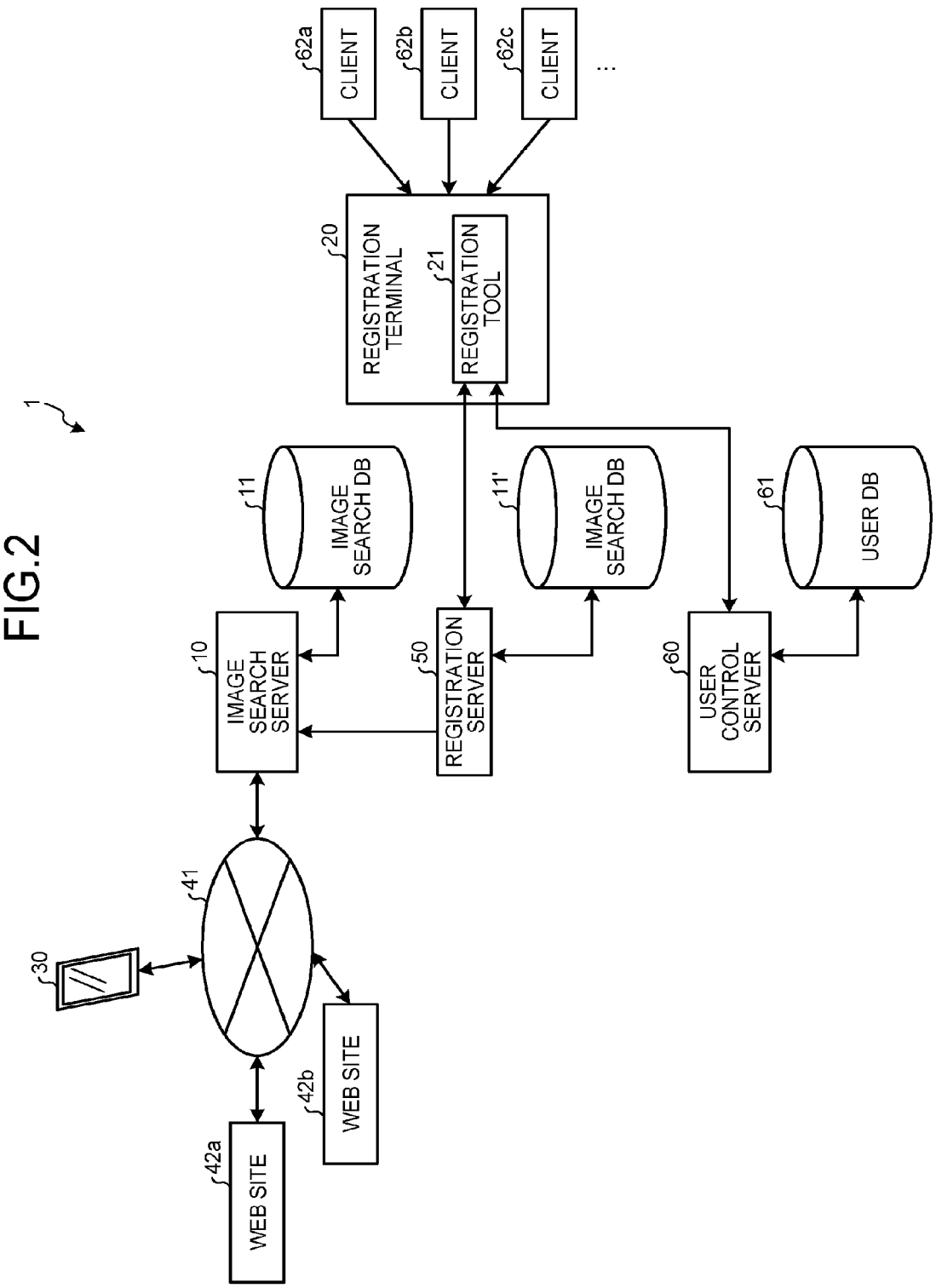
FIG. 2 is a diagram schematically illustrating an exemplary information processing system according to the respective embodiments.

FIG. 2 is a diagram schematically illustrating an exemplary information processing system according to the respective embodiments. Note that components same as FIG. 1 are denoted by same reference signs in FIG. 2, and a detailed description therefor will be omitted.

In FIG. 2, the information processing system 1 includes the image search server 10, registration terminal 20, and registration server 50. The information processing system 1 may further include a user control server 60. Meanwhile, for sake of description, the diagram is illustrated in FIG. 2 such that the image search DB 11 is connected to the outside of the image search server 10. Further, the image search DB 11 further includes a metadata DB that stores metadata relative to images stored in the image DB 14.

Here, image registration is performed per campaign in the information processing system 1. In the present invention, a "campaign" indicates any types of event planed by a client such as a campaign advertisement. The campaign includes one or more images and respective link information associated with each of the images. The metadata includes attribute information of the campaign. Further, each of the images included in the campaign will be conveniently referred to as a page. In other words, the image(s) is included in the campaign per page.

As described above, the image search server 10 analyzes, by the analysis unit 12, the image (captured image) transmitted from the search terminal 30 via the Internet 41 and extracts the feature information, and then retrieves, from the image DB 14, feature information similar to the extracted feature information by the search unit 13. Further, the image search server 10 acquires, from the link information DB 15, the link information corresponding to the image identifying information associated with the feature information retrieved from the image DB 14, and transmits the link information to the search terminal 30.

The registration server 50 includes an image search DB 11' corresponding to the image search DB 11, and includes an analysis unit 12 and a search unit 13 same as the image search server 10. Further, the image search DB 11' further includes a metadata DB to store metadata relative to images included in the image search DB 11'.

The registration terminal 20 includes a registration tool 21. The registration terminal 20 is provided with the images and the link information to be associated with the images from clients 62a, 62b, 62c, etc. The registration terminal 20 associates the respective images provided from the clients 62a, 62b, 62c, etc. with the link information respectively, and transmits the same to the registration server 50. This processing to associate the images provided from the clients 62a, 62b, 62c, etc. with the link information and transmit the same to the registration server 50 is executed by the registration tool 21 in the registration terminal 20.

The registration server 50 registers the images and link information transmitted from the registration terminal 20 in the image search DB 11'. More specifically, the registration server 50 analyzes the image transmitted from the registration terminal 20 by the analysis unit 12 included in the registration server 50 and extracts, from the image, the feature information representing a feature of the image. The registration server 50 associates the image identifying information with the extracted feature information, and stores the same in the image DB 14 included in the image search DB 11', and associates the image identifying information with the link information corresponding to the image stored in the image DB 14 and stores the same in the link information DB 15, thereby registering the image in the image search DB 11'.

Meanwhile, the image and the link information to be stored in the image DB 14 and the link information DB 15 are further associated with the metadata including information representing a user who has made registration (such as user ID). The user information can be acquired from a user DB 61 described later.

At the time of registering the image in the registration server 50, the registration terminal 20 can execute similar image check to check whether any image similar to the image to be registered is already registered in the registration server 50.

For example, the registration terminal 20 transmits, to the registration server 50, an image intended to check whether any similar image thereto is already registered. The registration server 50 analyzes the image transmitted from the registration terminal 20 by the analysis unit 12 in response to the request, and extracts feature information. Based on the extracted feature information, the registration server 50 searches the image DB 14 inside the image search DB 11' by the search unit 13 and transmits a search result to the registration terminal 20. For example, the registration terminal 20 displays and presents a message indicating the search result transmitted from the registration server 50 on a display, for example. By this message, it is possible to find whether any image similar to the check target image is already registered in the image search DB 11'. In accordance with this result, change and correction can be made to the image.

The registration server 50 transmits, to the image search server 10, an image and link information which are set disclosable out of the images (feature information) and link information registered in the image search DB 11', and the disclosable image and the link information are registered in the image search DB 11. For example, the registration server 50 communicates with the image search server 10 at predetermined timing such as night time, and retrieves, from among the images registered in the image search DB 11' of the registration server 50, an image that is set disclosable and also has not yet registered in the image search DB 11 of the image search server 10. Further, the registration server 50 transmits a retrieved image and the link information associated with the retrieved image to the image search server 10. The image search server 10 registers, in the image search DB 11, the image and the link information transmitted from the registration server 50.

The user control server 60 includes the user DB 61, and controls information of a user who uses the information processing system 1. For example, the user DB 61 stores information of the clients 62a, 62b, 62c, etc., information of a user who can utilize the functions of the registration terminal 20 (registration tool 21), and information of an administrator who administrates the image search server 10 and the registration server 50.

The user control server 60 controls the user information in four levels such as a general administrator, a domain administrator, a client administrator, and a client. The general administrator has authority to be able to access information of the domain administrator, client administrator, and client. The domain administrator has authority to be able to access the information of the client administrator and the client, and the client administrator has authority to be able to access the client information. The client can access only the information of each client oneself. The respective information registered in the user DB 61 can be viewed and edited from the registration terminal 20 by using the registration tool 21 in accordance with the authority provided to each of the levels.

Figure 3:
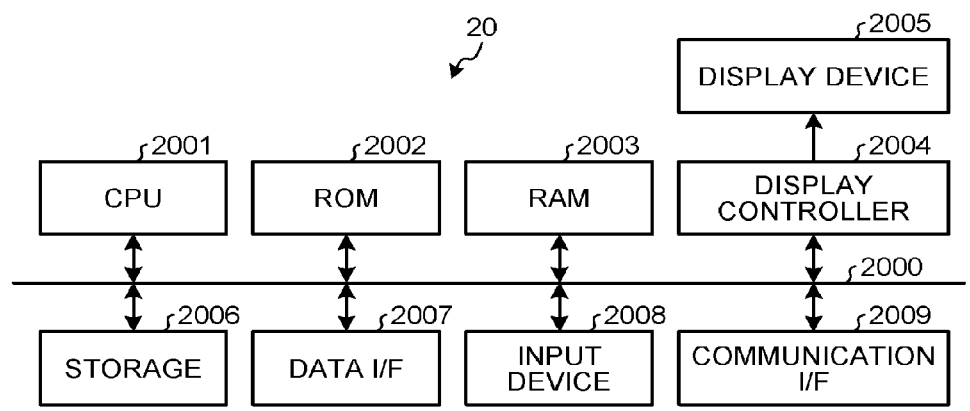
FIG. 3 is a block diagram illustrating an exemplary configuration of hardware of a registration terminal applicable to the respective embodiments.

FIG. 3 is a block diagram illustrating an exemplary configuration of hardware of the registration terminal 20 applicable to the respective embodiments. In the registration terminal 20 illustrated in FIG. 3, a CPU 2001, read only memory (ROM) 2002, random access memory (RAM) 2003, and a display controller 2004 are connected to a bus 2000. Further, a storage 2006, a data interface (I/F) 2007, an input device 2008, and a communication I/F 2009 are connected to the bus 2000.

The storage 2006 is a storage medium that can store data in a non-volatile manner, and a hard disk drive is used, for example. Not limited thereto, non-volatile semiconductor memory such as flash memory may also be used as the storage 2006. The storage 2006 stores a program to be executed by the CPU 2001 and various kinds of data.

The CPU 2001 uses the RAM 2003 as a work memory and entirely controls the registration terminal 20 in accordance with programs stored in the ROM 2002 and the storage 2006.

The display controller 2004 converts a display control signal generated by the CPU 2001 to a signal that can be displayed by a display device 2005, and outputs the same. The display controller 2004 drives the display device 2005 based on the display control signal generated by the CPU 2001. The display device 2005 is driven by the display controller 2004, and performs display in accordance with the display control signal.

The data I/F 2007 exchange data with an external apparatus. For example, an interface such as universal serial bus (USB) or Bluetooth (registered trademark) can be applied as the data I/F 2007. The communication I/F 2009 performs wireless communication via a network under control of the CPU 2001.

The input device 2008 includes a pointing device such as a mouse and a keyboard, and receives input from a user. The user can provide a command to the registration terminal 20 by operating the input device 2008 in accordance with display on the display device 2005, for example.

Figure 4:
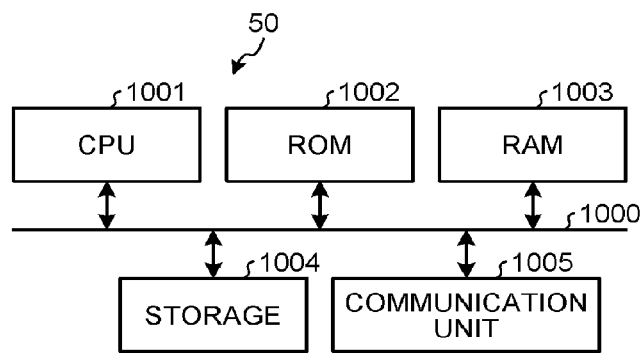
FIG. 4 is a block diagram illustrating an exemplary configuration of hardware of a registration server according to the respective embodiments.

FIG. 4 is a block diagram illustrating an exemplary configuration of hardware of the registration server 50 according to the respective embodiments. In FIG. 4, the registration server 50 has a CPU 1001, ROM 1002, RAM 1003, a storage 1004, and a communication unit 1005 connected to a bus 1000. The storage 1004 is a storage medium that can store data in a non-volatile manner, and a hard disk drive is used, for example. Not limited thereto, non-volatile semiconductor memory such as flash memory may be used as the storage 1004.

The CPU 1001 controls the entire registration server 50 by using the RAM 1003 as a work memory in accordance with programs stored in the ROM 1002 and the storage 1004.

The storage 1004 stores the program executed by the CPU 1001 and various kinds of data. Further, the above-described image search DB 11' is formed by using a storage area on the storage 1004. Meanwhile, the storage 1004 is formed of one hardware in FIG. 4, but not limited to this example, a plurality of storage devices may be formed as one storage 1004 to perform integral control, for example.

The communication unit 1005 includes a communication I/F that performs wireless communication via a network in accordance with control of the CPU 1001.

Meanwhile, in FIG. 4, the registration server 50 is formed of one hardware, but not limited to this example, the registration server 50 may be formed by integrally controlling a plurality of server devices having the same configuration. Further, the image search server 10 can be implemented by the same configuration as the registration server 50. Therefore, a description therefor will be omitted here.

Figure 5:
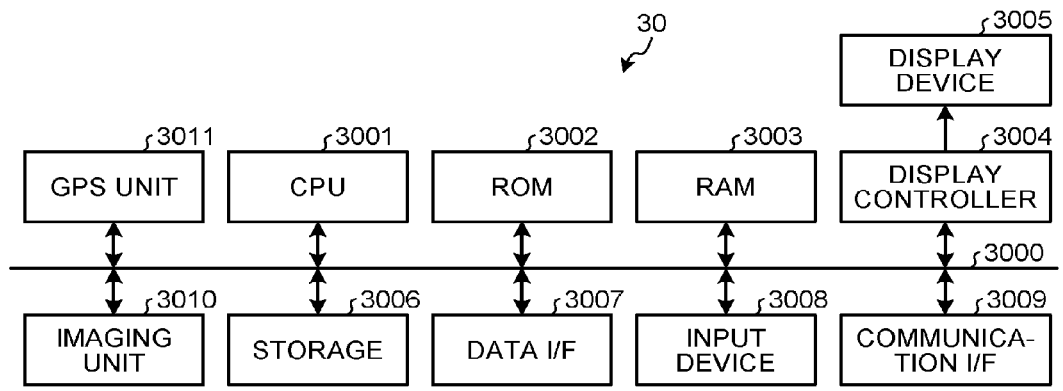
FIG. 5 is a block diagram illustrating an exemplary configuration of hardware of a search terminal applicable to the respective embodiments.

FIG. 5 is a block diagram illustrating an exemplary configuration of hardware of the search terminal 30 applicable to the respective embodiments. In the search terminal 30 illustrated in FIG. 5, a CPU 3001, ROM 3002, RAM 3003, and a display controller 3004 are connected to a bus 3000. Further, a storage 3006, a data I/F 3007, an input device 3008, a communication I/F 3009, an imaging unit 3010, and a GPS unit 3011 are connected to the bus 3000.

The storage 3006 is a storage medium that can store data in a non-volatile manner, and is non-volatile semiconductor memory such as flash memory. Not limited thereto, a hard disk drive may also be used as the storage 3006. The storage 3006 stores a program executed by the CPU 3001 and various kinds of data. Meanwhile, the storage 3006 and the ROM 3002 may share one rewritable non-volatile semiconductor memory or the like, for example.

The CPU 3001 uses the RAM 3003 as a work memory, and controls the entire search terminal 30 in accordance with the programs stored in the ROM 3002 and the storage 3006. The display controller 3004 converts a display control signal generated by the CPU 3001 to a signal that can be displayed by a display device 3005, and outputs the same.

The data I/F 3007 exchanges data with an external apparatus. For example, an interface such as universal serial bus (USB) or Bluetooth (registered trademark) can be applied as the data I/F 3007.

The display controller 3004 drives a display device 3005 based on the display control signal generated by the CPU 3001. The display device 3005 includes, for example, a liquid crystal display (LCD), and is driven by the display controller 3004 and performs display in accordance with the display control signal.

The input device 3008 receives input from a user. The user can provide a command to the search terminal 30 by, for example, operating the input device 3008 in accordance with display on the display device 3005. Meanwhile, preferably, the input device 3008 and the display device 3005 are integrally formed as a touch panel that outputs a control signal corresponding to a pressed position and further transmits therethrough an image on the display device 3005.

The communication I/F 3009 performs wireless communication via the network under control of the CPU 3001.

The imaging unit 3010 includes an optical system, an imaging element, and a control drive circuit for the optical system and the imaging element, and applies predetermined processing to an imaging signal output from the imaging element and outputs the same as a captured image by a digital signal. The imaging unit 3010 performs functions such as imaging, zooming, etc. in accordance with a command provided by the user's operation at the input device 3008. The captured image output from the imaging unit 3010 is transmitted to the CPU 3001 via the bus 3000, and subjected to the predetermined image processing in accordance with the program. The captured image output from the imaging unit 3010 and subjected to the image processing can be stored in, for example, the storage 3006. Further, the CPU 3001 reads the captured image from the storage 3006, and can transmit the same to the network by the communication I/F 3009.

The GPS unit 3011 receives a signal from a global positioning system (GPS), and calculates a current position including longitude and latitude based on the received signal.

Figure 6:
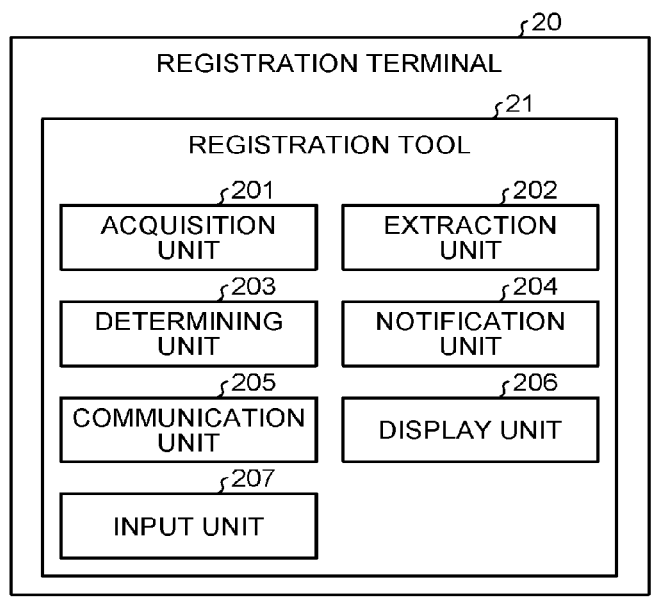
FIG. 6 is a functional block diagram to describe functions of the registration terminal according to the respective embodiments.

FIG. 6 is a functional block diagram to describe functions of the registration terminal 20 according to the respective embodiments. The registration terminal 20 includes the registration tool 21. The registration tool 21 includes an acquisition unit 201, an extraction unit 202, a determining unit 203, a notification unit 204, a communication unit 205, a display unit 206, and an input unit 207. These acquisition unit 201, extraction unit 202, determining unit 203, notification unit 204, communication unit 205, display unit 206, and input unit 207 are implemented by a program executed on the CPU 2001.

The communication unit 205 controls communication performed via the network, and functions as a transmission unit to transmit data on the network and a receiving unit to receive the data from the network.

The display unit 206 generates display information to be displayed on the display device 2005. More specifically, in the registration terminal 20, the CPU 2001 generates a display control signal based on the display information generated by the display unit 206, and passes the generated display control signal to the display controller 2004. The display controller 2004 performs display according to the display information on the display device 2005 in accordance with the display control signal. Meanwhile, in the following, a series of operation to perform display on the display device 2005 in accordance with the display information generated by the display unit 206 will be recited as, for example, "the display unit 206 performs display". The input unit 207 receives information input by inputting operation to the input device 2008.

The acquisition unit 201 acquires an image from the outside of the registration terminal 20. For example, the acquisition unit 201 acquires an image from the client 62a. The acquisition unit 201 may also acquire an image transmitted from another apparatus owned by the client 62a via the network, or may also receive an image via a recording medium such as a compact disk (CD) and a digital versatile disk (DVD). Further, the acquisition unit 201 may also acquire an image from a printed medium such as a paper. Furthermore, the acquisition unit 201 acquires, from the client 62a, information for the link information to be associated with the image.

The extraction unit 202 extracts an image of a predetermined area in the image acquired by the acquisition unit 201. The determining unit 203 determines whether any image that is partly or entirely similar to an image to be registered in the registration server 50 is already stored in the registration server 50. The notification unit 204 notifies information indicating a determining result by the determining unit 203.

The acquisition unit 201, extraction unit 202, determining unit 203, notification unit 204, communication unit 205, display unit 206, and input unit 207 included in the above-described registration tool 21 are implemented by an information processing program executed on the CPU 2001. The information processing program is provided by, for example, preliminarily being stored in the storage 2006. Not limited thereto, the information processing program can be provided by being stored on the computer connected to the network so as to be downloaded by the communication I/F 2009 via the network. Further, the information processing program may also be configured to be provided or distributed via the network.

Not limited thereto, the information processing program may also be provided by being recorded in a computer-readable recording medium such as a CD and a DVD in a file format installable or executable. In this case, the information processing program recorded in the recording medium is supplied to the registration terminal 20 via an external drive device connected to, for example, the data I/F 2007. Not limited thereto, the information processing program recorded in the recording medium may also be stored once on a different information processing apparatus such as a personal computer, and then may be supplied to the registration terminal 20 from the different information processing apparatus by communication via the communication I/F 2009 and data I/F 2007.

The information processing program has a module configuration including, for example, the above-described units (acquisition unit 201, extraction unit 202, determining unit 203, notification unit 204, communication unit 205, display unit 206, and input unit 207). The above-mentioned units are loaded on a main storage device (such as RAM 2003) as the actual hardware when the CPU 2001 reads and executes the information processing program from the storage 2006, and the respective units are generated on the main storage device.

Figure 7:
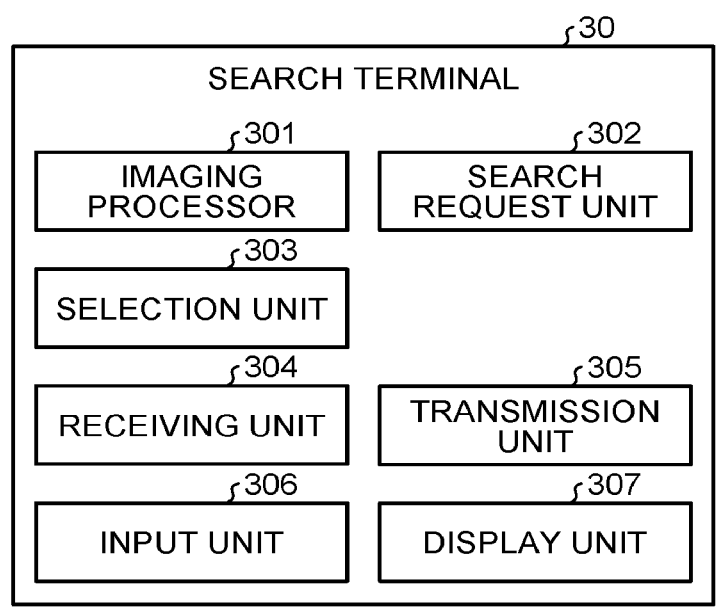
FIG. 7 is an exemplary functional block diagram to describe functions of the search terminal applicable to the respective embodiments.

FIG. 7 is an exemplary functional block diagram to describe functions of the search terminal 30 applicable to the respective embodiments. In FIG. 7, the search terminal 30 includes an imaging processor 301, a search request unit 302, a selection unit 303, a receiving unit 304, a transmission unit 305, an input unit 306, and a display unit 307.

The above imaging processor 301, search request unit 302, selection unit 303, receiving unit 304, transmission unit 305, input unit 306, and display unit 307 are implemented by a program executed on the CPU 3001. Not limited thereto, the imaging processor 301, search request unit 302, selection unit 303, receiving unit 304, transmission unit 305, input unit 306, and display unit 307 may be partly or entirely implemented by hardware mutually operating in a cooperative manner.

The imaging processor 301 starts a camera function included in the search terminal 30 and controls the imaging unit 3010, and outputs a captured image. The receiving unit 304 performs receiving processing for data transmitted via the network. The transmission unit 305 performs data transmission processing via the network. The input unit 306 receives input operation to the input device 3008 included in the search terminal 30, and acquires data according to the operation. The display unit 307 controls information display on the display device 3005 included in the search terminal 30. The input unit 306 and the display unit 307 constitute a user interface (UI) of the search terminal 30.

The search request unit 302 generates a search request to request search based on the captured image obtained by the imaging processor 301. The search request unit 302 transmits the captured image and the generated search request to the image search server 10 from the transmission unit 305. The selection unit 303 generates a selection screen in order to select desired information from link information returned from the image search server 10 in response to the search request, and passes the selection screen to the display unit 307. Further, the selection unit 303 performs processing corresponding to the selected link information in response to the input operation received by the input unit 306 in accordance with the selection screen.

(Image Registration Processing According to Respective Embodiments)

Figure 8:
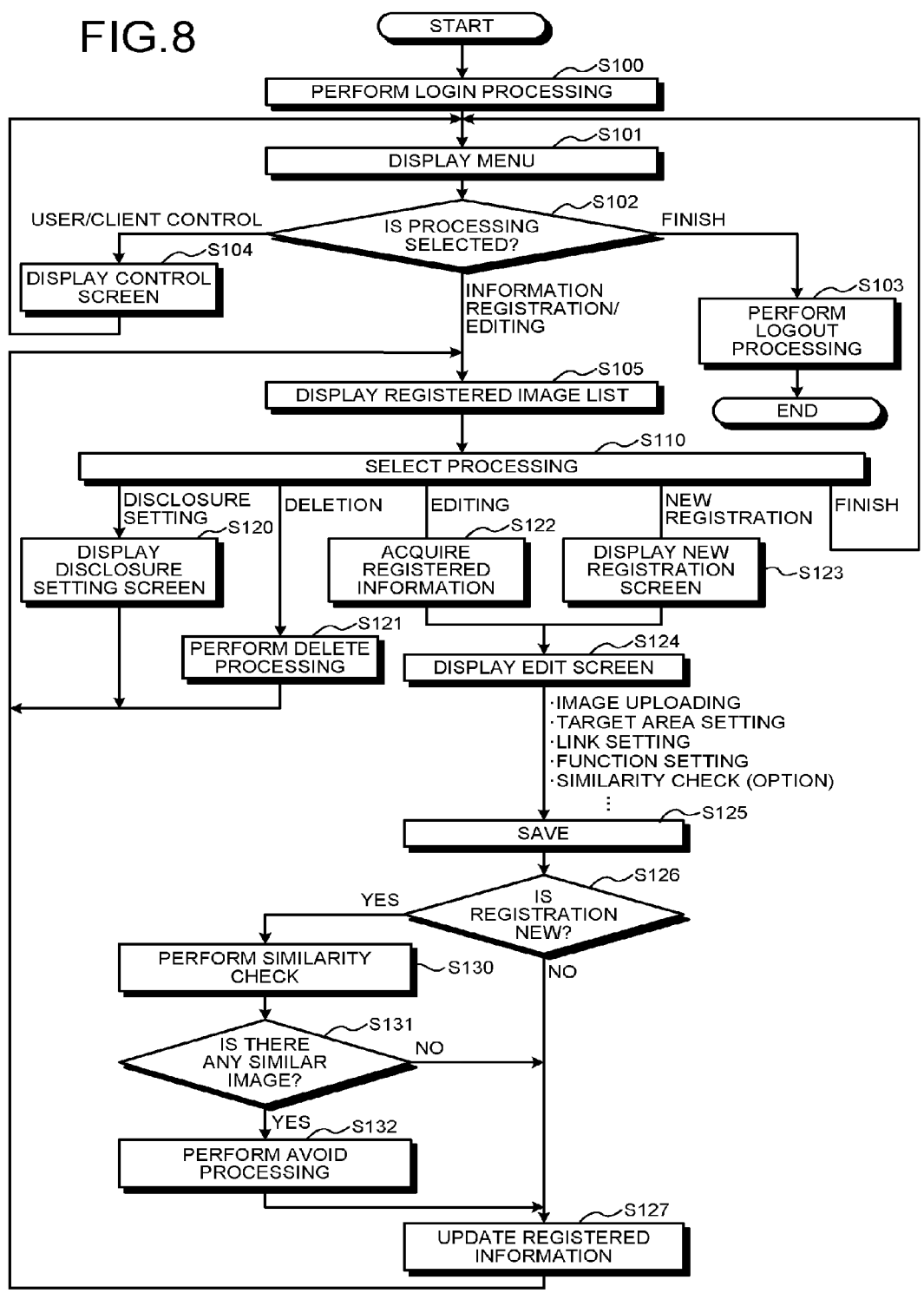
FIG. 8 is a flowchart illustrating exemplary image registration processing executed by a registration tool in the registration terminal according to the respective embodiments.

Next, image registration processing according to the embodiments will be described. FIG. 8 is a flowchart illustrating exemplary image registration processing executed by the registration tool 21 in the registration terminal 20 according to the respective embodiments. Note that information (user ID and password) of a user who utilizes the registration tool 21 is preliminarily registered in the user DB 61 by the user control server 60 before the processing illustrated in the flowchart of FIG. 8. Further, note that image registration is performed per campaign in the following.

Figure 9:
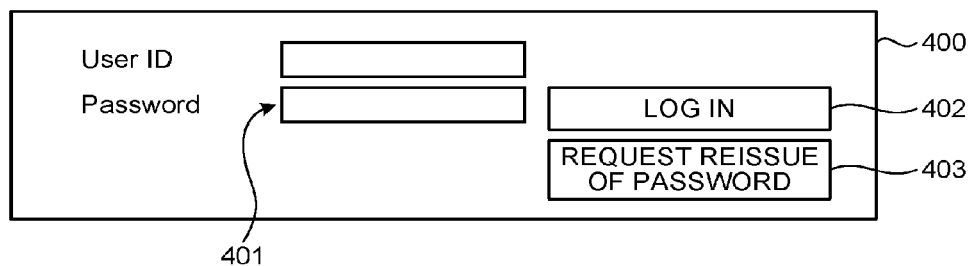
FIG. 9 is a diagram illustrating an exemplary login screen according to the respective embodiments.

When the registration tool 21 is started in the registration terminal 20, the registration tool 21 performs login processing for the user in Step S100. For example, the registration tool 21 displays, on the display unit 206, a login screen 400 exemplified in FIG. 9. In the example of FIG. 9, the login screen 400 includes an input section 401 to input the user information (user ID and password), a button 402 to command login, and a button 403 to request reissue of the password.

For example, when the user ID and the password are input to the input section 401, the registration tool 21 transmits the input user ID and password to the user control server 60 and requests authentication of the user ID. In the case where the registration tool 21 receives, from the user control server 60, information indicating successful authentication of the user ID, the processing is shifted to Step S101.

In Step S101, the registration tool 21 displays, on the display unit 206, a menu screen 410 exemplified in FIG. 10. In the example of FIG. 10, tabs 411*a*, 411*b*, and 411*c*, a group of buttons 412, a search input section 413, a list display area 414, and a finish button 415 are arranged on the menu screen 410.

The tabs 411*a*, 411*b*, and 411*c* are used to determine an operation mode of the registration tool 21 by selecting a menu item. The tabs 411*a* and 411*b* are used to shift the operation mode to a user control mode, and an administrator list and a client list are displayed respectively by operating these tabs. Further, the tab 411*c* is used to shift the operation mode to an image registration mode, and a list of campaigns (a campaign list) is displayed by operating this tab.

In the list display area 414, a list corresponding to the menu item selected from among tabs 411*a*, 411*b*, and 411*c* is displayed. In the example of FIG. 10, the tab 411*b* is operated, and the client list is displayed. In the following, each line of the list will be referred to as a record, and each column will be referred to as an item.

The group of buttons 412 is used to select processing applied to the list displayed on the list display area 414. In the example of FIG. 10, the group of buttons 412 includes four buttons, and the respective buttons are assigned with respective functions including "new registration", "edit", "delete", and "CSV output" from the left side. The "new registration" button is used to add a new record to the list displayed on the list display area 414. The "edit" button is used to edit information of a selected record in the list displayed on the list display area 414. The "delete" button is used to delete information of a selected record in the list displayed on the list display area 414. The "CSV output" button is used to output information of the list displayed on the list display area 414 in a text file of comma-separated values (CSV) format.

The search input section 413 is used to select a record from the list displayed on the list display area 414 based on a search key selected or input. The finish button 415 is used to finish the processing by the registration tool 21.

Now, description is returned to FIG. 8. When the menu is displayed in Step S101, the processing is shifted to next Step S102, and any one of the tabs 411*a*, 411*b*, 411*c*, and the finish button 415 is operated and the registration tool 21 waits for the processing to be selected. In the case where the finish button 415 is operated, the registration tool 21 shifts the processing to Step S103 to perform user logout processing, and then operation of the registration tool 21 is finished.

Further, in the case where the tab 411*a* or the tab 411*b* is operated and the user control mode is selected in Step S102, the registration tool 21 shifts the processing to Step S104. Further, in Step S104, in accordance with which one of the tabs 411*a* and 411*b* is operated in Step S102, the registration tool 21 displays either one of the administrator list screen and the client list screen. When operation to complete the processing on the administrator list screen or the client list screen is performed, the registration tool 21 returns the processing to Step S101 and displays the menu.

Further, in the case where the tab 411*c* is operated and the image registration mode is selected in Step S102, the registration tool 21 shifts the processing to Step S105. In Step S105, the registration tool 21 displays, on the display unit 206, a registered information list screen 420 as exemplified in FIG. 11, and waits for user operation. In FIG. 11, buttons 421*a* to 421*d*, a search input section 422, a list display area 423, and a finish button 424 are arranged on the registered information list screen 420.

A campaign list to be registered in the registration server 50 is displayed on the list display area 423. At this point, the registration tool 21 can select a campaign that can be accessed by a user who has logged in the registration tool 21 out of campaigns registered in the registration server 50, and can display the selected campaign on the list display area 423. For example, the registration tool 21 acquires, from the user control server 60, information related to the user who currently logs in, and based on this information, the registration tool 21 acquires a list of the campaign that can be accessed by the user from the metadata DB of the registration server 50.

The button 421*a* is a "new registration" button to add a new record to the list displayed on the list display area 423. The button 421*b* is an "edit" button to edit information of a record selected in the list displayed on the list display area 423. The button 421*c* is a "delete" button to delete information of a record selected in the list displayed on the list display area 423. Further, the button 421*d* is a button to set whether to open or closed a campaign registered in the selected record of the list displayed on the list display area 423.

According to the example of FIG. 11, in the list displayed on the list display area 423, each of records includes respective items of "campaign name", "client name", "user ID", "contact person name", "pages open to public", "number of used pages", "latest update date", "status", "contact administrator", "host domain", "remarks", and "CSV output". The information of the record is metadata of the campaign displayed on the record, and is stored in the metadata DB included in the image search DB 11' of the registration server 50, for example.

Meanwhile, the record is created per campaign, and is associated with one or more images included in one campaign, and for example, the record is generated based on metadata registered in the metadata DB. The registration tool 21 acquires the information of the record displayed in the list display area 423 from the metadata DB included in the image search DB 11' of the registration server 50.

In each of the records of the list displayed in the list display area 423, the item of "campaign name" represents a name given to the campaign registered in the record. The item "client name" represents an owner of the campaign of the record. The item "user ID" represents an ID of the owner of the campaign. The item "contact person name" represents a name of a user who has input information of the campaign of the record.

The item "pages open to public" represents the number of disclosed pages set so as to be opened to public out of the pages included in the campaign of the record. For example, a page on which a "target area" described later is designated is set as the opened page. The item "number of used pages" represents all of the pages included in the campaign of the record. More specifically, the number of pages indicated in the item "number of used pages" is displayed even when the campaign of the record is in a closed state. Meanwhile, the record having a value "0" in both of the items "pages open to public" and "number of used pages" indicates that only the campaign information is registered and no image has been registered yet.

The item "latest update date" represents a date when the campaign information of the record is edited last time. The item "state" represents whether the state of disclosure for a campaign of the record is set to be opened or closed. The item "contact administrator" represents a host administrator of the user. The host administrator takes in charge of the campaign of the record. The item "host domain" represents information of the domain to which the "contact administrator" belongs. In the item "remarks", any information can be input. Further, the item "CSV output" is used to output the information of the record in a text file of the CSV format.

When the registered information list screen 420 is displayed in Step S105, the registration tool 21 shifts the processing to Step S110 and waits for operation to the buttons 421a to 421d and the finish button 424. In the following, the processing in response to operation to each of the buttons will be described in accordance with the following items (1) to (5).

(1) In Step S110, in the case where the button 424 that commands finish of operation is operated, the registration tool 21 returns the processing to Step S101 and displays the menu, for example.

(2) In Step S110, in the case where the button 421d is operated in order to set a campaign to be opened or closed in a state that a record is selected in the list display area 423, the registration tool 21 shifts the processing to Step S120. In Step S120, the registration tool 21 displays, on the display unit 206, a public setting screen in order to set the campaign in the selected record to be disclosed or not disclosed.

Figure 12:
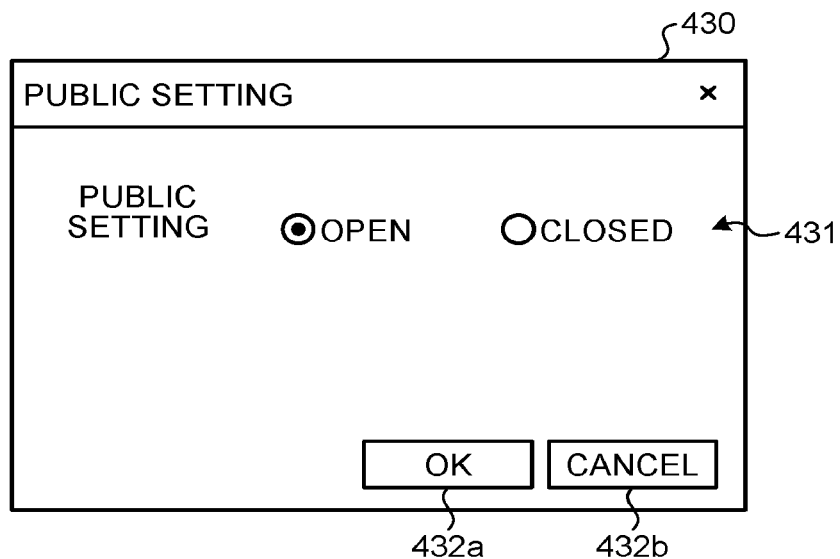
FIG. 12 is a diagram illustrating an exemplary public setting screen according to the respective embodiments.

FIG. 12 illustrates an exemplary public setting screen. In FIG. 12, a public setting unit 431, an OK button 432a, and a cancel button 432b are arranged on the public setting screen 430. In the example of FIG. 12, whether open or close the campaign can be exclusively set by a radio button at the public setting unit 431, and an initial value is set to "open" in the item of the selected record. When the OK button 432a is operated, the registration tool 21 sets a state of public to either open or closed at the disclosure setting portion 431 relative to this record. When the state of public is set, the registration tool 21 updates display of the list display area 423, and returns the processing to Step S105. Further, in the case where the cancel button 432b is operated, the registration tool 21 sets the state of public for the record to the state before displaying the public setting screen 430, and returns the processing to Step S105.

(3) In Step S110, in the case where the button 421c that commands deletion of an image is operated in a state that a record is selected in the list display area 423, the registration tool 21 shifts the processing to Step S121. In Step S121, the registration tool 21 deletes information of the selected record. At this point, preferably, the registration tool 21 displays a confirmation screen to confirm, for example, whether the record should be really deleted and whether the record should be deleted together with image information associated with the record. When the record is deleted, the registration tool 21 updates display of the list display area 423, and returns the processing to S105.

(4) In Step S110, in the case where the button 421b that commands editing an image is operated, the registration tool 21 shifts the processing to Step S122. In Step S122, the registration tool 21 acquires, from the registration server 50, an image included in the campaign of the record selected in the list displayed on the list display area 423 of the registered information list screen 420. In the case where the acquired image is associated with link information, the registration tool 21 acquires the link information as well. Then, the registration tool 21 shifts the processing to Step S124.

(5) Further, in Step S110, in the case where the button 421a that commands new registration is operated, the registration tool 21 shifts the processing to Step S123, and performs registration processing for a new campaign. In Step S123, the registration tool 21 displays, on the display unit 206, a campaign registration screen 440 as exemplified in an example of FIG. 13 in order to perform new registration of the campaign.

Figure 13:
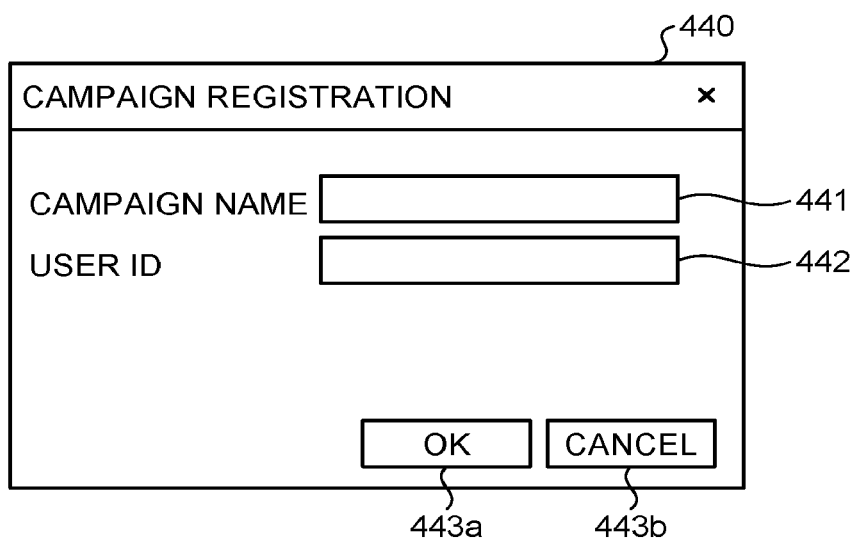
FIG. 13 is a diagram illustrating an exemplary campaign registration screen according to the respective embodiments.

In FIG. 13, input sections 441 and 442 to input a campaign name and a user ID, an OK button 443a, and a cancel button 443b are arranged on the campaign registration screen 440. A character string input in the input section 441 corresponds to a value of the item "campaign name" in the record. In the same manner, a character string input in the input section 442 corresponds to a value of the item "user ID" in the record.

When the OK button 443a is operated, the registration tool 21 sets the respective character strings input in the input sections 441 and 442 as the "campaign name" and the "user ID" on the campaign registration screen 440, and shifts the processing to Step S124.

Figure 14:
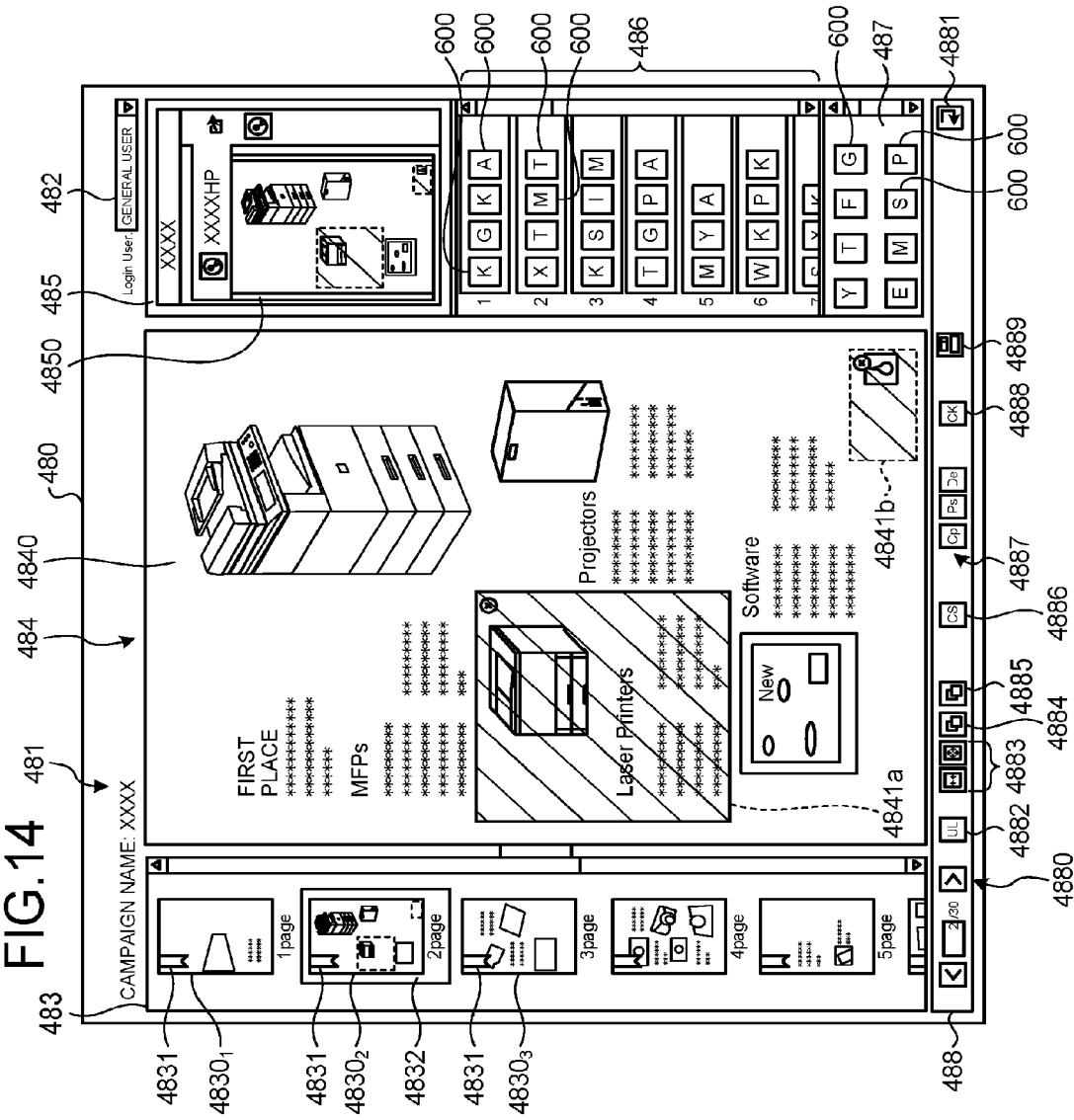
FIG. 14 is a diagram illustrating an exemplary edit screen according to the respective embodiments.

In Step S124, the registration tool 21 displays, on the display unit 206, an edit screen to edit the campaign information. FIG. 14 illustrates an exemplary edit screen. In FIG. 14, the edit screen 480 includes a header area 481, a thumbnail display area 483, a page editing area 484, a preview area 485, a target area list area 486, a link icon list area 487, and a toolbar 488.

In the header area 481, a campaign name to be edited in the edit screen 480 is displayed at a left end, and a user menu display section 482 is arranged at a right end thereof. In the user menu display section 482, a menu that can be utilized under authority of a user who currently logs in the registration tool 21 is displayed.

The thumbnail display area 483 is an area where a thumbnail image obtained by reducing each of the images included in the campaign is displayed. For example, in the case where the processing is shifted from Step S122 to Step S124 to command editing the above-mentioned campaign information, the registration tool 21 acquires, from the image DB 14 of the registration server 50, each of the images acquired from the registration server 50 in Step S122 and included in the campaign shown in the record selected from the list display area 423. Then, the registration tool 21 reduces each of the acquired images and generates a thumbnail image, and displays the same in the thumbnail display area 483. In the example of FIG. 14, the thumbnail images $4830_1$, $4830_2$, $4830_3$, etc. are displayed in the thumbnail display area 483.

Meanwhile, in the case where the processing is shifted from Step S123 to Step S124 to command new registration of the above-mentioned campaign information, the thumbnail display area 483 is empty. Further, by operating a scroll bar disposed at a left end of the thumbnail display area 483, other thumbnail images virtually displayed outside the thumbnail display area 483 can be sequentially displayed inside the thumbnail display area 483.

In the page editing area 484, an image 4840 to be edited is displayed out of each of the images included in the campaign. For example, the registration tool 21 displays, in the page editing area 484, an original image of the thumbnail image as the image 4840 selected from among the respective thumbnail images $4830_1$, $4830_2$, $4830_3$, etc. displayed on the thumbnail display area 483. In the example of FIG. 14, the thumbnail image $4830_2$ is selected in the thumbnail display area 483, and the original image of the selected thumbnail image $4830_2$ is displayed as the image 4840 in the page editing area 484. Further, in the thumbnail display area 483, the thumbnail image $4830_2$ selected and currently displayed in the page editing area 484 is highlighted by a surrounding frame 4832.

In the case where a range is designated with respect to the image 4840 displayed in the page editing area 484, the registration tool 21 can set the designated area as a target area. The range is designated by, for example, the input unit 207 receiving user's operation to the input device 2008. For example, by designating optional two points inside the image 4840 displayed in the page editing area 484, a rectangular range having these two vertexes on a diagonal line is designated. In the example of FIG. 14, target areas 4841a and 4841b are respectively set by the rectangular ranges with respect to the image 4840 in the page editing area 484.

The registration tool 21 can clearly display the target areas 4841a and 4841b by indicating, for example, the inside of the set target areas 4841a and 4841b in a color different from the outside of the target areas. Further, the shape of the target area is not limited to the rectangle, and any kind of shape can be optionally set as long as the shape has a closed shape.

The registration tool 21 generates identifying information (such as serial numbers) to identify the respective set target areas 4841a and 4841b, and associates the identifying information with the respective target areas 4841a and 4841b. The identifying information is generated such that the target area can be identified through each of the images included in the campaign to be edited.

Further, while the details will be described later, the registration tool 21 can associate one or more link information with the target areas 4841a and 4841b set in the page editing area 484.

Furthermore, among the respective thumbnail images $4830_1$, $4830_2$, $4830_3$, etc. displayed in the thumbnail display area 483, the registration tool 21 adds a marker image 4831 to a thumbnail image that has been subjected to some kind of editing, such as designation of a target area in the page editing area 484, and that corresponds to an image not yet stored.

The preview area 485 displays a preview screen 4850 emulating a screen on which an image being edited in the page editing area 484 is displayed on the display device 3005 of the search terminal 30 by an application program corresponding the information processing system 1. The registration tool 21 clearly displays, in the preview area 485, the respective target areas 4841a and 4841b which have been set in the page editing area 484 in a highlighting manner and the like. Further, the registration tool 21 displays, in the preview area 485, the information indicating the link information which has been set for the respective target areas 4841a and 4841b in a manner correlated to the respective target areas 4841a and 4841b.

In the target area list area 486, a list of the link information added to each of the target areas set for each of the images included in the campaign to be edited is displayed by using icon images 600, 600, etc. In the example of FIG. 14, the registration tool 21 displays, in the target area list area 486, the link information grouped for each of the identifying information (serial number) added to the corresponding target area. Further, by operating a scroll bar at the right end in the target area list area 486, the link information of other target areas virtually displayed outside the target area list area 486 can be sequentially displayed inside the target area list area 486.

The link icon list area 487 displays a list of the link information that can be set for the target areas by using the icon images 600, 600, etc. corresponding to the respective link information. The registration tool 21 associates the link information corresponding to the icon images 600, 600, etc. with the target area 4841a by moving the icon image 600 displayed in the link icon list area 487 by so-called drag-and-drop operation, and superimposing the icon image on, for example, the target area 4841a set inside the page editing area 484. Further, multiple link information can be associated with one target area.

By operating a scroll bar provided at the right end in the link icon list area 487, other icon images 600 virtually arranged outside the link icon list area 487 can be sequentially made to appear and be displayed inside the link icon list area 487.

Meanwhile, in the case where the link information is associated with the target area, the icon image 600 indicating the associated link information can be displayed at a predetermined position in the target area. Preferably, which link information is associated with the target area 4841a can be easily found by such displaying. Further, associating the link information with the target area is reflected on display in the preview area 485.

In the toolbar 488, a page designating section 4880 to designate a page (image) to be displayed in the page editing area 484, and a button to execute various functions included in the registration tool 21, and a group of buttons 4881 to 4889 are arranged. The button 4881 is used to return the screen from the edit screen 480 to the registered information list screen 420.

Figure 15:
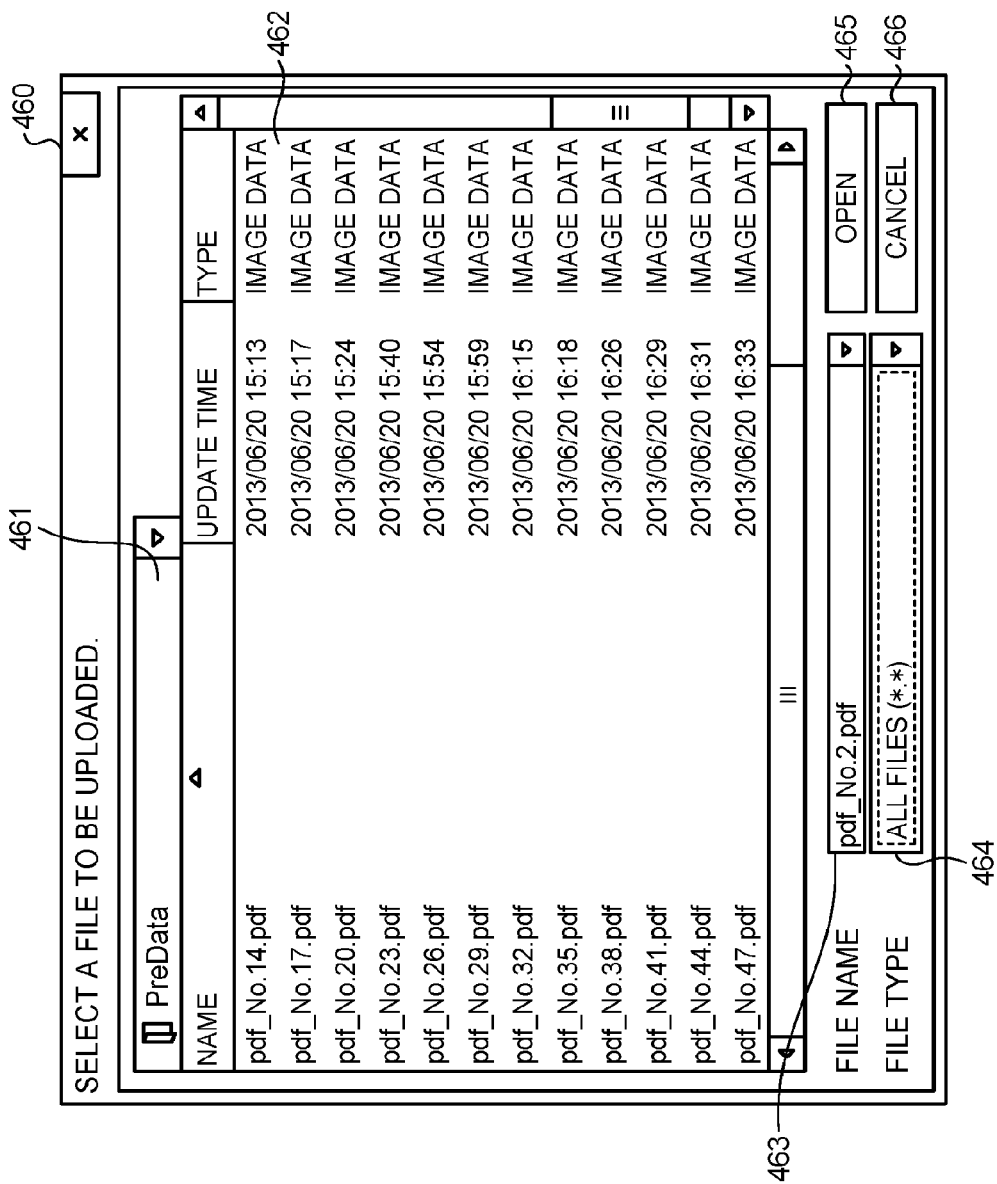
FIG. 15 is a diagram illustrating an exemplary file selection screen according to the respective embodiments.

The button 4882 is used to upload an image to the registration server 50 from the registration terminal 20. When the button 4882 is operated, the registration tool 21 displays, on the display unit 206, a file selection screen 460 as exemplified in FIG. 15, for example. In FIG. 15, the file selection screen 460 is, for example, a standard file selection screen provided by an operating system (OS) executed on the CPU 2001 of the registration terminal 20, in which a folder designating section 461, a file list display area 462, a file name display unit 463, a file format designating section 464, and buttons 465, 466 are arranged.

The file list display area 462 displays a list of files stored in a folder designated in the folder designating section 461. The file format designating section 464 designates a format of a file to be displayed in the file list display area 462. The file name display unit 463 displays a file name of a file selected in the file list display area 462. One or more files are selected from the files displayed in the file list display area 462 by operating the button 465, thereby passing information indicating the selected file from the OS to the registration tool 21, for example. The registration tool 21 transmits, from the registration terminal 20, the file indicated in the file information passed to the registration server 50 from the OS, and executes uploading of the image to the registration server 50. The button 466 is used to return the screen to the edit screen 480 without performing file uploading.

Returning to the description for FIG. 14, the group of buttons 4883 includes two buttons to adjust a display size of the image 4840 displayed in the page editing area 484.

The button 4884 is used to switch an area setting mode of setting an area inside the page editing area 484 to a target area setting mode of setting a target area. In the case where the area is designated over the image 4840 displayed in the page editing area 484 after an edit mode is switched to the target area setting mode by operating the button 4884, the registration tool 21 sets the area as the target area.

The button 4885 is used to switch the area setting mode to designate the area inside the page editing area 484 to a mask setting mode to designate a mask area from which feature information is not extracted by the analysis unit 12. In the case where the area is designated over the image 4840 displayed in the page editing area 484 after the edit mode is switched to the mask setting mode by operating the button 4885, the registration tool 21 sets the area the mask area.

Figure 16:
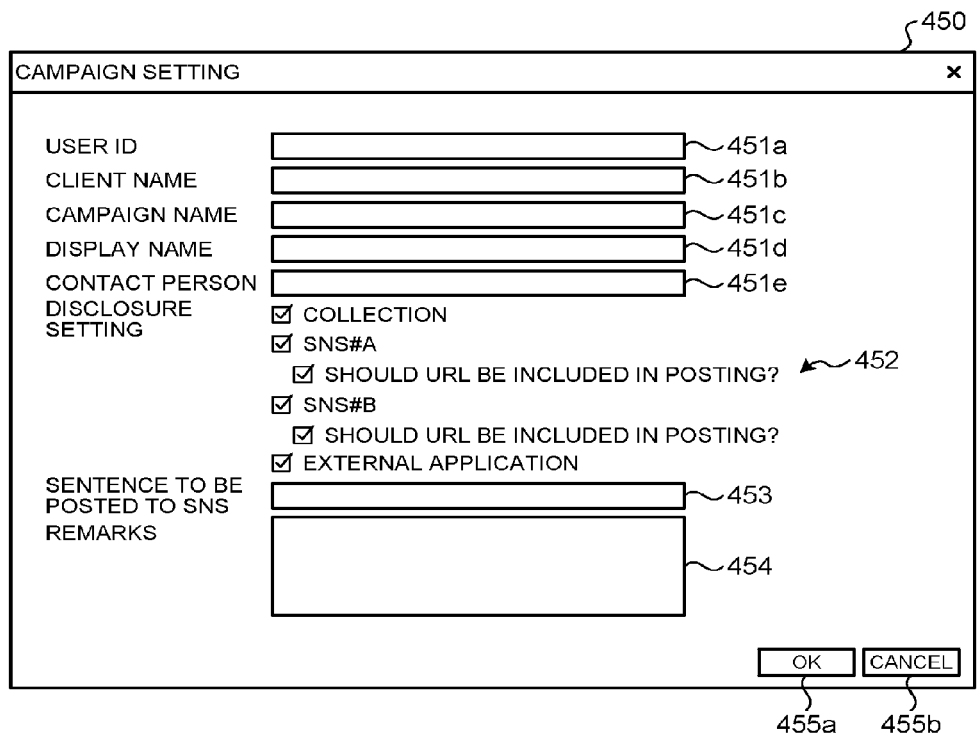
FIG. 16 is a diagram illustrating an exemplary campaign setting screen according to the respective embodiments.

The button 4886 is used to display a campaign setting screen in order to set details of a campaign. FIG. 16 illustrates an exemplary campaign setting screen. In FIG. 16, display areas 451a, 451b, input areas 451c to 451e, 453, 454, a public-method setting section 452, and buttons 454a, 455b are arranged in the campaign setting screen 450. In the display areas 451a and 451b, values of the items "user name" and "client name" of the record on the registered information list screen 420 illustrated in FIG. 11 are displayed respectively in an unchangeable manner.

The input area 451c is used to input a campaign name. In the input area 451c, a value of the item "campaign name" of the record on the registered information list screen 420 is input by default. The input area 451d is used to input a display name used when the campaign is displayed at the search terminal 30. The input area 451e is used to input, for example, a name of a contact person who registers the campaign.

The public-method setting section 452 is used to set a disclosing method for the campaign. Note that disclosure referred herein is operation at the search terminal 30 in the case of performing predetermined operation on the search terminal 30. In the example of FIG. 16, setting items including "collection", a plurality of social networking services (SNS) such as "SNS #A" and "SNS #B", and an "external application" are provided in the public-method setting section 452. In the public-method setting section 452, a plurality of disclosing methods can be designated at the same time.

Among the public-methods that can be set at the public-method setting section 452, the setting item "collection" is used to save campaign information in the search terminal 30. The setting items "SNS #A" and "SNS #B" are used to post the campaign information to the SNS and SNS #B respectively. In the setting items "SNS #A" and "SNS #B", URL can be included in posting content by ticking "should a URL be included in posting?". The item "external application" is used to display the campaign information at the search terminal 30 by using an external application program for the application program relative to the information processing system 1.

In the case where disclosure by the "SNS #A" and the "SNS #B" is set in the public-method setting section 452, the input area 453 is used to input a sentence to be posted when the campaign information is posted to the SNS #A and the SNS #B. The input area 454 is used to input remarks relative to the campaign, for example.

The button 455a is used to reflect, as campaign setting information, the information input and set in the input areas 451c to 451e, 453, 454 and the public-method setting section 452, and return the screen back to the edit screen 480. The campaign setting information is included in the metadata of the campaign. In the case where the button 455a is operated, the registration tool 21 updates the record and the metadata corresponding to the campaign based on, for example, the information input in the input areas 451c to 451e, 453, 454 and the setting values set in the public-method setting section 452. The button 455b is used to return the screen to the edit screen 480 without updating the record and the metadata corresponding to the campaign.

Returning to the description for FIG. 14, the group of buttons 4887 includes three buttons to execute copy, paste, and delete of information respectively.

The button 4888 is used to execute similar image check to check whether an image including a portion partly or entirely similar to the image (page) 4840 currently displayed in the page editing area 484 of the edit screen 480 is already registered in the image search server 10. For example, this check is directed to the registration server 50 instead of the image search server 10, and is performed by setting, as a checking target, an image set to "open" by the campaign setting information out of the images registered in the registration server 50. Not limited thereto, an image which is registered in the registration server 50 and set to "closed" may also be set as the checking target. Further, the image search server 10 may be directly set as the checking target. The registration tool 21 displays, on the display unit 206, a search result transmitted from the registration server 50. The user can edit the image again based on the search result.

At this point, for example, the registration tool 21 may request search for a similar image by transmitting, to the registration server 50, only the image inside the target area set in accordance with operation of the button 4884, as the checking target. Further, the registration tool 21 can exclude, from the checking target, an image inside the mask area set in accordance with operation of the button 4885. Furthermore, the registration tool 21 may request search for the similar image by dividing the image 4840 currently displayed in the page editing area 484 and by transmitting the respective divided images to the registration server 50 such that the similar image check is executed for the respective images.

The button 4889 is used to provide a command to save the campaign currently edited on the edit screen 480.

Now, description is returned to FIG. 8. When the button 4889 is operated, the registration tool 21 shifts the processing to Step S125 and starts save processing for the campaign. When the save processing is started, the registration tool 21 shifts the processing to Step S126 and determines whether the campaign to be saved is a newly registered campaign. In the case where the processing is shifted from the above-described Step S122 to Step S126, the registration tool 21 determines that the campaign is not the newly registered campaign, and shifts the processing to Step S127.

On the other hand, in the case where the processing is shifted from the above-described Step S123 to Step S126, the registration tool 21 determines the campaign is the newly registered campaign and shifts the processing to Step S130.

In Step S130, the registration tool 21 executes the similar image check for the images set with the target areas out of the images included in the campaign to be saved, and determines whether any image including a portion partly or entirely similar to each of the images is already registered in the registration server 50 as described above. For example, the registration tool 21 transmits, to the registration server 50, all of the images included in the campaign to be saved, and requests search for the similar image. In next Step S131, in the case of determining that there is no similar image registered in the registration server 50 based on the search result, the registration tool 21 shifts the processing to Step S127.

Figure 17:
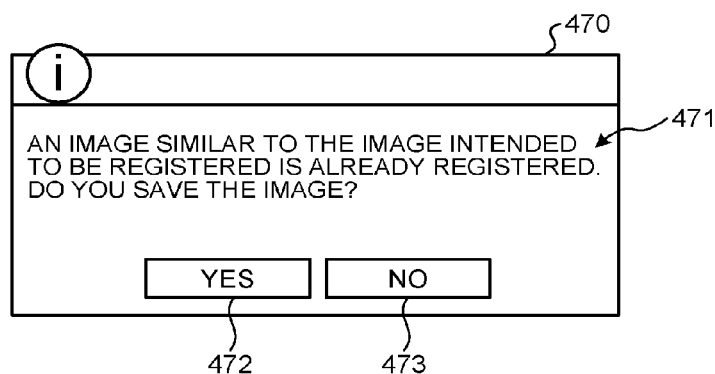
FIG. 17 is a diagram illustrating an exemplary warning screen according to the respective embodiments.

On the other hand, in the case of determining that there is a similar image registered in the registration server 50 based on the search result in Step S131, the registration tool 21 shifts the processing to Step S132. In Step S132, the registration tool 21 displays, for example, a warning screen exemplified in FIG. 17 by the display unit 206. In FIG. 17, a warning message 471 indicating that the similar image is already registered in the registration server 50 is displayed on a warning screen 470. Also, a "YES" button 472 and a "NO" button 473 are arranged.

In the case where the "NO" button 473 is operated in the warning screen 470, the registration tool 21 can perform avoid processing to avoid registration of the similar image. As an example, the registration tool 21 displays a message to urge execution of the avoid processing, on the display unit 206, to avoid the similar image from being registered, and returns the processing to Step S124. In this case, examples of the avoid processing may include changing an image included in a campaign to be saved, setting a mask area for the image, changing a target area, and so on. When the avoid processing is executed, the processing is shifted to Step S127.

On the other hand, in the case where the "YES" button 472 is operated in the warning screen 470, the registration tool 21 shifts the processing to Step S127 without executing the above-described avoid processing and can register the image.

In Step S127, the registration tool 21 transmits the campaign information to the registration server 50, and requests the registration server 50 to update the registered information. For example, the registration tool 21 transmits, to the registration server 50, each of the images included in the campaign, each of the link information to be associated with each of the images, and the metadata of the campaign. The registration server 50 updates the image DB 14, the link information DB 15, and the metadata DB based on the respective information transmitted from the registration terminal 20 in response to the request from the registration tool 21.

Upon transmitting the request to update the information to the registration server 50 in Step S127, the registration tool 21 returns the processing to Step S105.

In the above-described configuration, when a plurality of images having feature information similar to one another in the image DB 14 of the image search server 10, the image search server 10 may cause erroneous recognition at the time of image search. Therefore, when an image is registered from the registration terminal 20 to the registration server 50 by using the registration tool 21, it is preferable to check whether any image similar to the image is already registered in the registration server 50. Further, the image to be registered may be changed or the like in the registration terminal 20 in accordance with a check result.

Figure 18A:
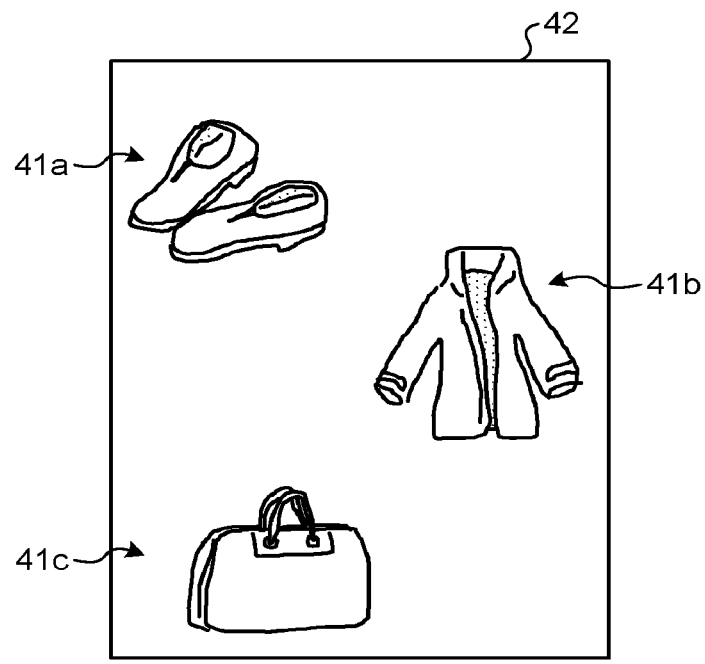
FIGS. 18A and 18B are diagrams to describe search for an image partly similar to a check target image as a similar image.
Figure 18B:
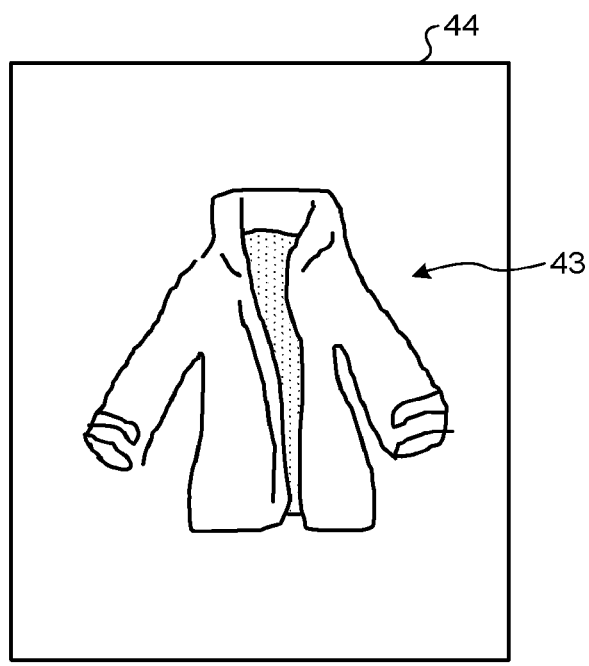

Here, in the case of determining similarity by using the feature information of the image, search can be made by setting an image partly similar to a checking target image as the similar image. As an example, assume a case of registering an image 42 including a plurality of objects 41a, 41b, 41c in the registration server 50 by using the registration tool 21 as exemplified in FIG. 18A. At this point, provided that an image 44 only including an object 43 having high similarity with the object 41b is already registered in the registration server 50 exemplified in FIG. 18B.

In this case, the registration tool 21 transmits the image 42 to the registration server 50 from the registration terminal 20, and requests the registration server 50 to execute similar image check for the image 42. The registration server 50 returns, to the registration terminal 20, information indicating the image 44 including the object 43 that has high similarity with the object 41b included in a part of the area inside the image 42 transmitted from the registration tool 21, as a search result. Therefore, the registration tool 21 determines, by the determining unit 203, that the image similar to the image 42 is already registered in the registration server 50.

Here, a user who operates the registration tool 21 can hardly find, in the image determined to be already registered in the registration server 50, which one of the respective objects 41a, 41b, 41c included in the image 42 is similar to the image that has been determined to have high similarity. In other words, since the image is registered as the feature information in the image DB 14 of the registration server 50, finding an original image from the feature information is considered difficult for the user. Therefore, it may be difficult for the user to determine what kind of edit is to be added to the image 42 in order that the similar image is determined to be not registered in the registration server 50.

(First Embodiment)

Figure 19:
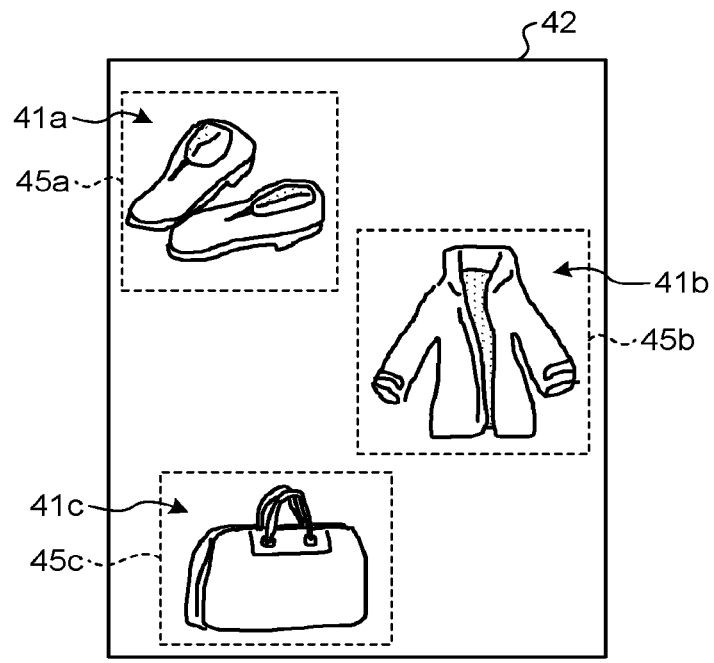
FIG. 19 is a diagram to describe similar image check processing according to a first embodiment of the present invention.
Figure 20:
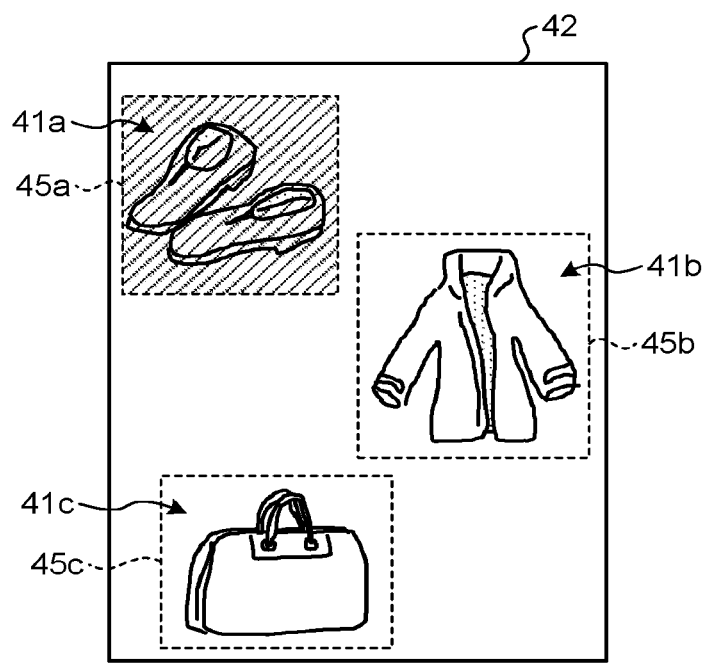
FIG. 20 is a diagram to describe the similar image check processing according to the first embodiment.

Similar image check processing according to a first embodiment will be more specifically described by using FIGS. 19 and 20. Note that components same as FIG. 18 described above are denoted by same reference signs in FIGS. 19 and 20, and a detailed description therefor will be omitted. An image 42 exemplified in FIGS. 19 and 20 is displayed in a page editing area 484 of an edit screen 480 in FIG. 14.

In the first embodiment, an area is set for a check target image, and similar image check is executed for an image inside the set area. As exemplified in FIG. 19, target areas 45a, 45b, and 45c are set so as to include objects 41a, 41b, and 41c included in the image 42. The target areas 45a, 45b, and 45c can be used as areas to be set as the checking targets.

For example, in the case where similar image check is commanded by operating a button 4888 on an edit screen 480, or during similar image check executed in Step S130 of FIG. 8, a registration tool 21 extracts, by an extraction unit 202, an image of the target area 45a designated in the image 42. Then, the registration tool 21 transmits the extracted image of the target area 45a to a registration server 50 by a communication unit 205, and requests search for the similar image to the image in the target area 45a.

The registration server 50 extracts feature information from the image in the target area 45a by an analysis unit 12, and a search unit 13 retrieves feature information similar to the extracted feature information from an image DB 14, and returns a search result to a registration terminal 20. In the registration terminal 20, the registration tool 21 display a search result on a screen to notify a user of the search result by using the notification unit 204 and the display unit 206.

The above-described similar image check processing is executed for the respective target areas 41a to 41c included in the image 42. The target areas for executing the similar image check processing may be designated by the user's operation at the registration tool 21, or may be designated by the registration tool 21 designating the respective target areas 41a to 41b set inside the image 42.

By this, the user can easily find whether any image similar to the image included in any of the target areas 45a to 45c designated in the image 42 is registered in the registration server 50. Therefore, by changing the image in the area determined to have the similar image already registered out of the target areas 45a to 45c, the user can avoid a situation in which the image similar to the image already registered in the registration server 50 is registered. As a result, search accuracy for similar image is improved.

(Second Embodiment)

Next, a second embodiment will be described by using FIGS. 21A to 24. Note that components same as FIGS. 18 and 19 described above will be denoted by same references sings in FIGS. 21A, 21B, 22, and 24, and a detailed description therefor will be omitted.

Figure 21A:
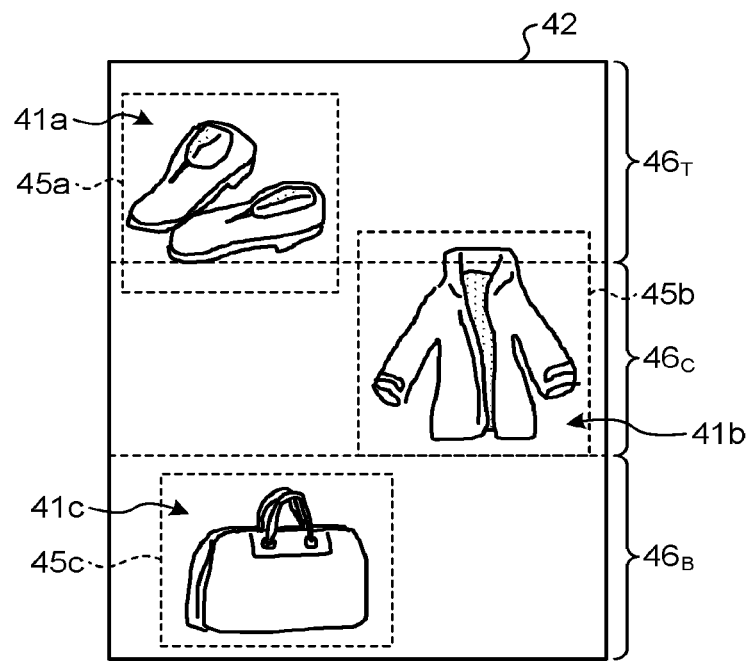
FIGS. 21A and 21B are diagrams to describe similar image check processing according to a second embodiment of the present invention.
Figure 21B:
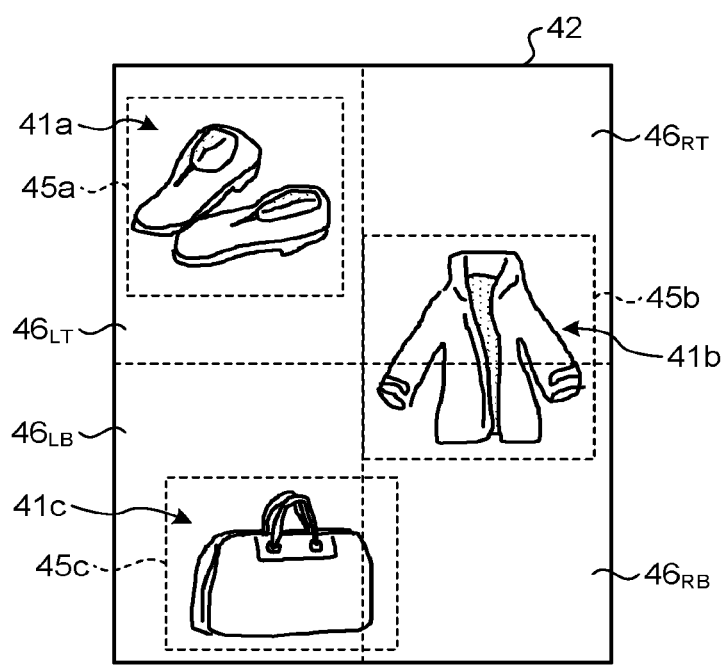

In the second embodiment, an image 42 is divided, and similar image check is executed for each of the divided areas. FIG. 21A is an example in which the image 42 is divided into three areas in a vertical direction, and the divided areas $46_T$, $46_C$, and $46_B$ are formed from the top. Further, FIG. 21B is an example in which the image 42 is divided into four areas in a grid pattern, and an upper left divided area $46_{LT}$, an upper right divided area $46_{RT}$, a lower left divided area $46_{LB}$, and a lower right divided area $46_{RB}$ are formed.

Note that a dividing position and number of dividing areas in the image 42 is not particularly limited. A registration tool 21 may set a position designated by user operation as the dividing position, and may set the dividing position in accordance with contents of the image 42. Needless to mention, the dividing position may be set in a fixed manner like the examples of FIGS. 21A and 21B. In the following, a description will be given for the case where the image 42 is divided into the four areas in a grid pattern as illustrated in FIG. 21B.

For example, in the case where similar image check is commanded by operating a button 4888 in an edit screen 480 or during the similar image check in Step S130 in FIG. 8, the registration tool 21 extracts, by an extraction unit 202, an image of the respective divided areas $46_{LT}$, $46_{RT}$, $46_{LB}$, and $46_{RB}$ from the image 42 and transmits the respective extracted images to the registration server 50 by a communication unit 205.

The registration server 50 executes similar image search processing for each of the images in the divided areas $46_{LT}$, $46_{RT}$, $46_{LB}$, and $46_{RB}$. In other words, the registration server 50 extracts, by an analysis unit 12, feature information from each of the images in the divided areas $46_{LT}$, $46_{RT}$, $46_{LB}$, and $46_{RB}$. A search unit 13 retrieves feature information similar to the respective extracted feature information from an image DB 14, and returns a search result to a registration terminal 20.

Figure 22:
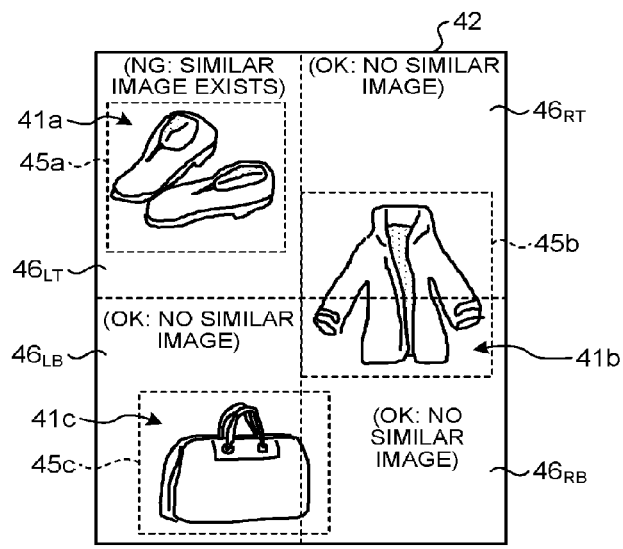
FIG. 22 is a diagram to describe the similar image check processing according to the second embodiment.

As a result of search for the respective images in the divided areas $46_{LT}$, $46_{RT}$, $46_{LB}$, and $46_{RB}$, the registration tool 21 determines, by a determining unit 203, that a similar image similar to the image in the upper divided area $46_{LT}$ of the image 42 is already registered in the registration server 50 (NG) as exemplified in FIG. 22. Further, the registration tool 21 determines, by the determining unit 203, that no similar image similar to the respective images in other divided areas $46_{RT}$, $46_{LB}$, and $46_{RB}$ is registered in the registration server 50 (OK).

Figure 23:
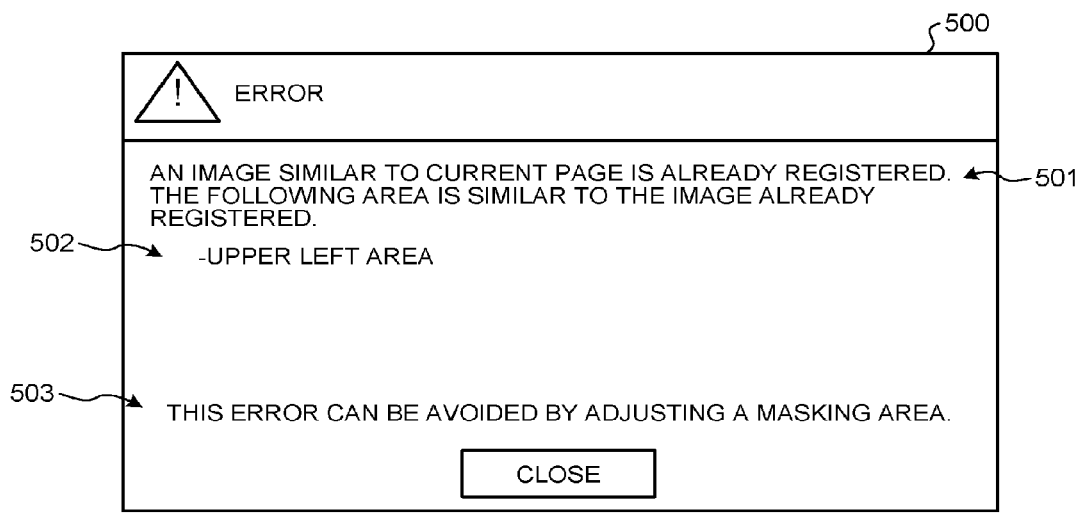
FIG. 23 is a diagram to describe the similar image check processing according to the second embodiment.

In this case, the registration tool 21 can display, for example, an error screen by using a notification unit 204 and a display unit 206. FIG. 23 illustrates an exemplary error screen. In FIG. 23, a warning message 501 indicating an error that an area including an image having a similar image already registered in the registration server 50 exists inside the image 42 and positional information 502 indicating such an area inside the image 42 are displayed on an error screen 500. In this example, the similar image similar to the image in the upper left divided area $46_{LT}$ out of the divided areas $46_{LT}$, $46_{RT}$, $46_{LB}$, and $46_{RB}$ is already registered in the registration server 50. Therefore, the notification unit 204 displays "upper left" as the positional information 502.

The registration tool 21 further displays, on the error screen 500 illustrated in FIG. 23, an advice message 503 to avoid the error indicated in the warning message 501 by the notification unit 204 and the display unit 206. In this example, the advice message 503 suggests that the error may be avoided by setting the mask area.

Figure 24:
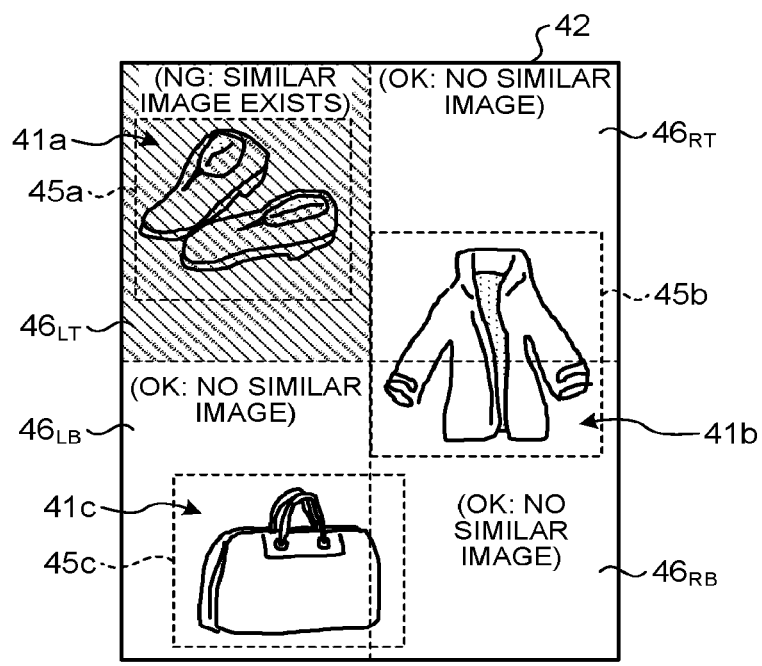
FIG. 24 is a diagram to describe the similar image check processing according to the second embodiment.

FIG. 24 illustrates an example of setting a mask area for the image 42. In this example, as indicated by diagonal lines in FIG. 24, the mask area is set in the upper left divided area $46_{LT}$ having a similar image similar thereto already registered in the registration server 50. As described above, the registration tool 21 sets the divided area $46_{LT}$ as a mask area by designating the divided area $46_{LT}$ on the image 42 by operating the button 4885.

In the case where the mask area is set in a search target image, the registration server 50 extracts feature information of the image from areas other than the mask area. Therefore, in the case of registering this image 42 in the registration server 50, the image 42 is prevented from being output as a search result even when the search target image is an image similar to the image inside the mask area. As a result, search accuracy for similar image is improved.

(Third Embodiment)

Next, a third embodiment will be described by using FIGS. 25A and 25B. Note that same components as FIGS. 18 and 19 described above are denoted by same reference signs in FIGS. 25A and 25B, and a detailed description therefor will be omitted.

In the third embodiment, a specific area of an image 42 is set as a mask area in a fixed manner. For example, in an image of a product catalog, a product brand and a logo image 47 of a manufacturer are generally placed in a predetermined position (upper right corner of the image 42 in this example) as illustrated in FIG. 25A. Further, the logo image 47 has a fixed shape depending on the brand and the manufacturer, and further generally has a clear contour. Therefore, the logo image 47 is likely to have clear feature information, and in the case of performing similar image search for an image including the logo image 47 as the search target image, a similar image based on the logo image 47 may be retrieved as a search result regardless of whatsoever image included in the search target image.

Figure 25A:
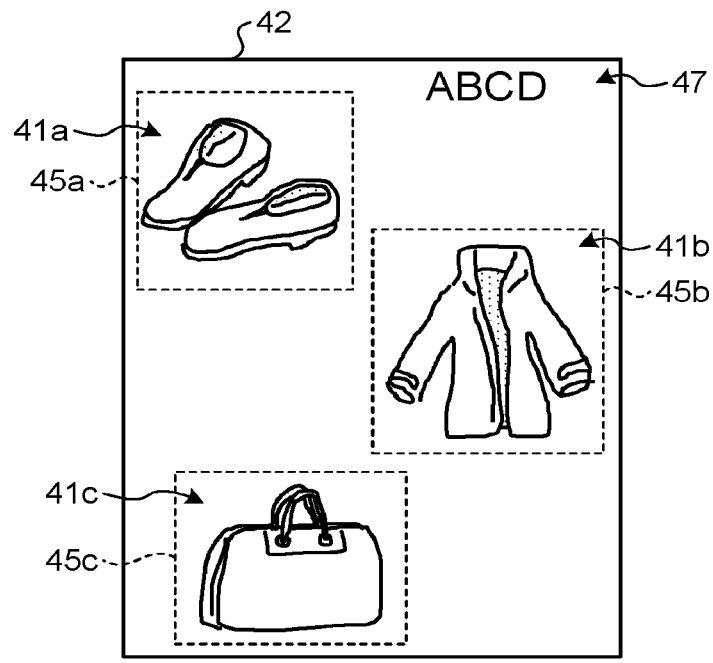
FIGS. 25A and 25B are diagrams to describe similar image check processing according to a third embodiment of the present invention.

For example, in the example of FIG. 25A, even in the case of intending to search a registration server 50 (or an image search server 10) for an image similar to an image of an object 41*b* included in a target area 45*b*, an image including an image similar to the logo image 47 may be output as a search result. In this case, an image of such a search result does not constantly include an image similar to the object 41*b*, and search accuracy is degraded.

Figure 25B:
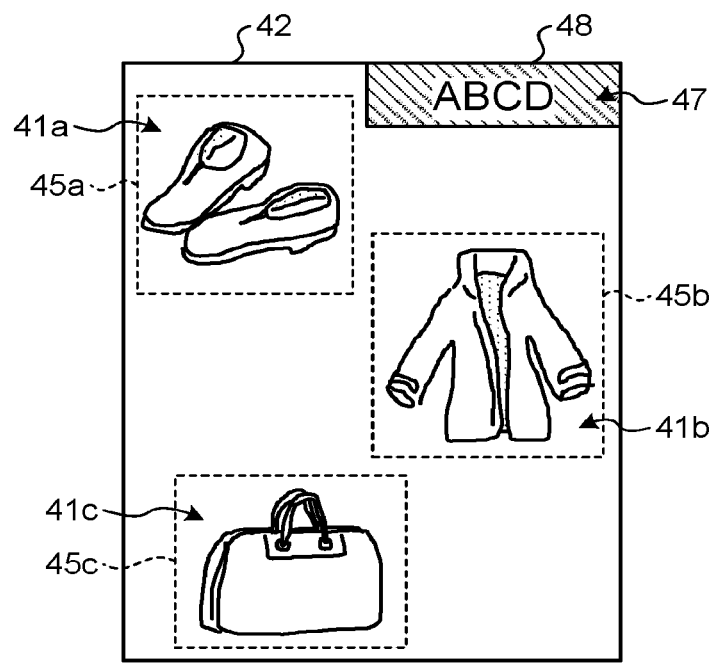

To solve this, according to the third embodiment, a registration tool 21 extracts a logo image area 48 including the logo image 47 and sets this area as a mask area by an extraction unit 202 as indicated by diagonal lines in FIG. 25B at the time of registering, in the registration server 50, the image 42 including the logo image 47. The logo image area 48 can be set per image (page) by the user's operation at the registration tool 21. Not limited thereto, the registration tool 21 may automatically set the logo image area 48 in accordance with coordinate information by preliminarily acquiring the coordinate information of the logo image area 48. Further, the registration tool 21 may extract the logo image area 48 from an image to be registered by using a technique such as image matching.

Thus, similar image search can be performed without influence of the logo image 47 by registering, in the registration server 50, the image 42 in which the logo image area 48 is set as the mask area. Therefore, similar image search can be executed with higher accuracy for the image 42 that includes the logo image 47.

Meanwhile, the above-described respective embodiments are the preferred work examples of the present invention, but not limited thereto, the embodiments can be implemented by making various kinds of modifications within a range not departing from the gist of the present invention.

According to the embodiments of the present invention, an effect of achieving to retrieve a similar image with higher accuracy is provided.

The present invention can be implemented in any convenient form, for example using dedicated hardware, or a mixture of dedicated hardware and software. The present invention may be implemented as computer software implemented by one or more network processing apparatus. The network can comprise any conventional terrestrial or wireless communications network, such as the Internet. The processing apparatus can compromise any suitably programmed apparatuses such as a general purpose computer, personal digital assistant, mobile telephone (such as a WAP or 3G-compliant phone) and so on. Since the present invention can be implemented as software, each and every aspect of the present invention thus encompasses computer software implemental on a programmable device. The computer software can be provided to the programmable device using any storage medium for storing processor readable code such as a floppy disk, hard disk, CD ROM, magnetic tape device or solid state memory device.

The hardware platform includes any desired kind of hardware resources including, for example, a central processing unit (CPU), a random access memory (RAM), and a hard disk drive (HDD). The CPU may be implemented by any desired kind of any desired number of processor. The RAM may be implemented by any desired kind of volatile or non-volatile memory. The HDD may be implemented by any desired kind of non-volatile memory capable of storing a large amount of data. The hardware resources may additionally include an input device, an output device, or a network device, depending on the type of the apparatus. Alternatively, the HDD may be provided outside of the apparatus as long as the HDD is accessible. In this example, the CPU, such as a cache memory of the CPU, and the RAM may function as a physical memory or a primary memory of the apparatus, while the HDD may function as a secondary memory of the apparatus.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An information processing apparatus comprising:
   a communication interface that connects to an image search device via a network to communicate with the image search device, the image search device being configured to register a plurality of images for search, search and retrieve an image, from among the registered plurality of images, based on a search target image transmitted from a terminal device, and transmit to the terminal device, a response; and
   processing circuitry configured to
      display a registered target image designated by a user;
      request to check whether a similar image that is retrieved based on the registration target image by search is registered in the image search device;
      display a result of the check indicating an area of the registration target image by which the similar image is retrieved when the similar image has been registered, without displaying the similar image retrieved by the check; and
      request to register the registration target image in the image search device.

2. The information processing apparatus according to claim 1, wherein
   the processing circuitry is further configured to
      extract a plurality of images from the registration target image, each of the plurality of the images being a predetermined area of the registration target image, whole area of the registration target image being covered by the plurality of the image;
      request to check whether a similar image that includes an image similar to the image of the predetermined area in the search device based on each of the extracted plurality of images; and
      display the result of the check in which an area of the registration target image is an area that corresponds to an image in which the similar image is included among the extracted plurality of images.

3. The information processing apparatus according to claim 2, wherein
   the processing circuitry extracts a plurality of predetermined areas being different from one another from the registration target image, and
   in the case where the processing circuitry determines that the similar image corresponding to at least one of the plurality of predetermined areas is registered in the image search device, the processing circuitry notifies which one of the plurality of predetermined areas includes an image similar to the similar image.

4. The information processing apparatus according to claim 3, wherein the processing circuitry is configured to set a mask area in the registration target image in order that the mask area is excluded from a search target when the image search device makes a search for an image similar to the search target image.

5. The information processing apparatus according to claim 4, wherein
the processing circuitry sets, as the mask area, an area including an image similar to the similar image out of the plurality of predetermined areas in the registration target image.

6. The information processing apparatus according to claim 4, wherein
the processing circuitry extracts the plurality of predetermined areas by dividing the registration target image, each divided areas being represented as one predetermined area.

7. The information processing apparatus according to claim 3, wherein
the processing circuitry extracts the plurality of predetermined areas by dividing the registration target image, each divided areas being represented as one predetermined area.

8. An information processing system comprising an image search device and an information processing apparatus;
the image search device including processing circuitry configured to register a plurality of images for search, search and retrieve an image, from among the registered plurality of images, based on a search target image transmitted from a terminal device, and transmit to the terminal device, a response, and
the information processing apparatus including a communication interface that connects to the image search device via a network to communicate with the image search device, and processing circuitry configured to
display a registered target image designated by a user;
request to check Whether a similar image that is retrieved based on the registration target image by search is registered in the image search device;
display a result of the check indicating an area of the registration target image by which the similar image is retrieved when the similar image has been registered, without displaying the similar image retrieved by the check; and
request to register the registration target image in the image search device.

9. The information processing system according to claim 8, wherein
the processing circuitry of the information processing apparatus is further configured to
extract a plurality of images from the registration target image, each of the plurality of the images being a predetermined area of the registration target image, whole area of the registration target image being covered by the plurality of the image;
request to check whether a similar image that includes an image similar to the image of the predetermined area in the search device based on each of the extracted plurality of images; and
display the result of the check in which an area of the registration target image is an area that corresponds to an image in which the similar image is included among the extracted plurality of images.

10. The information processing system according to claim 9, wherein
the processing circuitry of the information processing apparatus extracts a plurality of predetermined areas being different from one another from the registration target image, and in the case where the processing circuitry of the information processing apparatus determines that the similar image corresponding to at least one of the plurality of predetermined areas is registered in the image search device, the processing circuitry of the information processing apparatus notifies which one of the plurality of predetermined areas includes an image similar to the similar image.

11. The information processing system according to claim 10, wherein the processing circuitry of the information processing apparatus is configured to set a mask area in the registration target image in order that the mask area is excluded from a search target when the image search device makes a search for an image similar to the search target image.

12. The information processing system according to claim 11, wherein
the processing circuitry of the information processing apparatus sets, as the mask area, an area including an image similar to the similar image out of the plurality of predetermined areas in the registration target image.

13. The information processing system according to claim 11, wherein
the processing circuitry of the information processing apparatus extracts the plurality of predetermined areas by dividing the registration target image, each divided areas being represented as one predetermined area.

14. The information processing system according to claim 10, wherein
the processing circuitry of the information processing apparatus extracts the plurality of predetermined areas by dividing the registration target image, each divided areas being represented as one predetermined area.

15. An information processing method implemented in an information processing apparatus that is connected to an image search system via a network, the image search device being configured to register a plurality of images for search, search and retrieve an image, from among the registered plurality of images, based on a search target image transmitted from a terminal device, and transmit to the terminal device, a response, the information processing method comprising:
displaying a registered target image designated by a user;
requesting to check whether a similar image that is retrieved based on the registration target image by search is registered in the image search device;
displaying a result of the check indicating an area of the registration target image by which the similar image is retrieved when the similar image has been registered, without displaying the similar image retrieved by the check; and
requesting to register he registration target image in the image search device.

16. The information processing method according, to claim 15, further comprising:
extracting a plurality of images from the registration target image, each of the plurality of the images being a predetermined area of the registration target image, whole area of the registration target image being covered by the plurality of the image;
requesting to check whether a similar image that includes an image similar to the image of the predetermined area in the search device based on each of the extracted plurality of images; and
displaying the result of the check in which an area of the registration target image is an area that corresponds to an image in which the similar image is included among the extracted plurality of images.

* * * * *